(12) United States Patent
Uchida

(10) Patent No.: US 12,153,733 B2
(45) Date of Patent: Nov. 26, 2024

(54) ELECTRONIC DEVICE

(71) Applicant: CANON KABUSHIKI KAISHA, Tokyo (JP)

(72) Inventor: Takeshi Uchida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/170,017

(22) Filed: Feb. 16, 2023

(65) Prior Publication Data

US 2023/0266820 A1   Aug. 24, 2023

(30) Foreign Application Priority Data

Feb. 24, 2022 (JP) ................... 2022-027123

(51) Int. Cl.
*G06F 3/01* (2006.01)
*G01C 3/08* (2006.01)
(Continued)

(52) U.S. Cl.
CPC ............. *G06F 3/013* (2013.01); *G01C 3/085* (2013.01); *G02B 27/0172* (2013.01); *G02B 27/0179* (2013.01); *G02B 30/22* (2020.01); *G06F 3/012* (2013.01); *G06T 7/50* (2017.01); *G06T 7/70* (2017.01); *G06T 15/20* (2013.01); *G02B 2027/0129* (2013.01);
(Continued)

(58) Field of Classification Search
CPC ......... G06F 3/013; G06F 3/012; G01C 3/085; G02B 27/0172; G02B 27/0179; G02B 30/22; G02B 2027/0129; G02B 2027/0178; G02B 2027/0187; G02B 27/0093; G02B 27/017; G02B 2027/0134; G02B 2027/0138; G02B 2027/014; G06T 7/50; G06T 7/70; G06T 15/20; G06T 2207/30201; G06V 40/18
See application file for complete search history.

(56) References Cited

U.S. PATENT DOCUMENTS 8,139,087 B2 * 3/2012 Kuroki ................. G06T 19/006
                                                  345/419
8,179,366 B2 * 5/2012 Richardson ............ G06F 3/012
                                                  715/705
(Continued)

FOREIGN PATENT DOCUMENTS

JP   2003-230539 A   8/2003
JP   2005-249831 A   9/2005
JP   2009-210840 A   9/2009

*Primary Examiner* — Amy Onyekaba
(74) *Attorney, Agent, or Firm* — Cowan, Liebowitz & Latman, P.C.

(57) ABSTRACT

An electronic device according to the present invention includes at least one memory and at least one processor which function as: a gaze acquisition unit configured to acquire right gaze information related to a gaze of a right eye of a user that wears a display apparatus of an optical see-through type on a head and left gaze information related to a gaze of a left eye of the user; and a correlation acquisition unit configured to acquire, as information on personal differences, correlation information related to correlation between the gaze of the right eye and the gaze of the left eye on a basis of the right gaze information and the left gaze information.

18 Claims, 21 Drawing Sheets

(51) Int. Cl.
*G02B 27/01* (2006.01)
*G02B 30/22* (2020.01)
*G06T 7/50* (2017.01)
*G06T 7/70* (2017.01)
*G06T 15/20* (2011.01)
*G06V 40/18* (2022.01)

(52) U.S. Cl.
CPC ............... *G02B 2027/0178* (2013.01); *G02B 2027/0187* (2013.01); *G06T 2207/30201* (2013.01); *G06V 40/18* (2022.01)

(56) References Cited

U.S. PATENT DOCUMENTS

| | | | | |
|---|---|---|---|---|
| 9,557,568 | B1* | 1/2017 | Ouderkirk | G03B 21/28 |
| 10,173,129 | B2* | 1/2019 | Mikhailov | A63F 13/42 |
| 11,122,249 | B2* | 9/2021 | Lin | H04N 13/128 |
| 2006/0158730 | A1* | 7/2006 | Kira | H04N 13/133 |
| | | | | 359/462 |
| 2011/0273369 | A1* | 11/2011 | Imai | G06T 15/50 |
| | | | | 345/158 |
| 2012/0300046 | A1* | 11/2012 | Blayvas | H04N 13/383 |
| | | | | 348/54 |
| 2013/0021456 | A1* | 1/2013 | Inoue | H04N 13/144 |
| | | | | 348/51 |
| 2014/0333532 | A1* | 11/2014 | Ohbitsu | G06F 3/013 |
| | | | | 345/156 |
| 2015/0215611 | A1* | 7/2015 | Wu | G06T 7/593 |
| | | | | 345/419 |
| 2015/0294505 | A1* | 10/2015 | Atsmon | G06T 19/006 |
| | | | | 345/633 |
| 2016/0152184 | A1* | 6/2016 | Ogawa | G09G 5/10 |
| | | | | 345/589 |
| 2016/0175702 | A1* | 6/2016 | Black | G06T 19/006 |
| | | | | 463/31 |
| 2016/0353988 | A1* | 12/2016 | Moller | A61B 3/113 |
| 2017/0132780 | A1* | 5/2017 | Namioka | G06F 18/00 |
| 2017/0228886 | A1* | 8/2017 | Kashibuchi | G06T 19/006 |
| 2017/0280024 | A1* | 9/2017 | Murugesan | H04N 1/622 |
| 2018/0284885 | A1* | 10/2018 | Kim | G06F 3/013 |
| 2018/0286070 | A1* | 10/2018 | Benedetto | G06T 7/62 |
| 2019/0243131 | A1* | 8/2019 | Yi | G02B 27/0093 |
| 2019/0246889 | A1* | 8/2019 | Marin | A61B 3/08 |
| 2019/0349576 | A1* | 11/2019 | Yildiz | G02B 27/0093 |
| 2020/0150759 | A1* | 5/2020 | Zhang | G06F 3/017 |
| 2020/0174262 | A1* | 6/2020 | Godar | G06F 3/015 |
| 2020/0186775 | A1* | 6/2020 | Lin | G02B 27/0093 |
| 2020/0207358 | A1* | 7/2020 | Katz | G02B 27/0093 |
| 2020/0319709 | A1* | 10/2020 | Kaneko | G06F 3/04817 |
| 2020/0348752 | A1* | 11/2020 | Zerman | G06T 7/20 |
| 2021/0165484 | A1* | 6/2021 | Suguhara | G09G 5/00 |
| 2021/0191512 | A1* | 6/2021 | Ho | G09G 5/10 |
| 2021/0400250 | A1* | 12/2021 | Lin | H04N 13/117 |
| 2022/0236798 | A1* | 7/2022 | Kimura | G06F 3/013 |
| 2022/0404578 | A1* | 12/2022 | Lee | G02B 27/0179 |
| 2023/0068927 | A1* | 3/2023 | Choi | G06F 3/012 |

* cited by examiner

FIG. 21

|   | FEATURE AMOUNT | CORRELATION TABLE | NAME OF PERSON |
|---|---|---|---|
| 1 | FEATURE AMOUNT 1 | CORRELATION TABLE 1 | A |
| 2 | FEATURE AMOUNT 2 | CORRELATION TABLE 2 | B |
| 3 | FEATURE AMOUNT 3 | CORRELATION TABLE 3 | C |
| 4 | FEATURE AMOUNT 4 | CORRELATION TABLE 4 | D |
| 5 | FEATURE AMOUNT 5 | CORRELATION TABLE 5 | E |
| 6 | FEATURE AMOUNT 6 | CORRELATION TABLE 6 | F |

ELECTRONIC DEVICE

BACKGROUND OF THE INVENTION

Field of the Invention

The present invention relates to a control device that controls a display apparatus, such as a head-mounted display (HMD), of an optical see-through type worn by a user.

Description of the Related Art

Head-mounted displays (HMDs) that have a function of detecting the line of sight of a user, such as glass-type devices that use mixed reality (MR) or augmented reality (AR), have been rendered automatic and intelligent in recent years.

Japanese Patent Application Publication No. 2003-230539 proposes a display apparatus of an optical see-through type. A user that wears the display apparatus of the optical see-through type can visually recognize the outside world through an optical member (lens). Further, the user can see a virtual object displayed on the display apparatus as if the virtual object existed in the outside world. Japanese Patent Application Publication No. 2005-249831 proposes calibration for detecting the line of sight of one eye. Japanese Patent Application Publication No. 2009-210840 proposes depicting a virtual object with a parallax that matches the distance to an object between two captured images that can be viewed stereoscopically.

With the display apparatus according to Japanese Patent Application Publication No. 2003-230539, however, the virtual object is occasionally doubly seen (double view) separately on the right and left when the user sees an object in the outside world. The issue of double view cannot be resolved even if the calibration according to Japanese Patent Application Publication No. 2005-249831 (calibration for detecting the line of sight of one eye) is performed. Double view is caused for some users even if the method according to Japanese Patent Application Publication No. 2009-210840 is used, since the virtual object is depicted with a parallax that does not depend on the users.

SUMMARY OF THE INVENTION

The present invention provides a technique that makes it possible to suppress double view of a virtual object displayed on a display apparatus of an optical see-through type.

The present invention in its first aspect provides an electronic device including at least one memory and at least one processor which function as: a gaze acquisition unit configured to acquire right gaze information related to a gaze of a right eye of a user that wears a display apparatus of an optical see-through type on a head and left gaze information related to a gaze of a left eye of the user; and a correlation acquisition unit configured to acquire, as information on personal differences, correlation information related to correlation between the gaze of the right eye and the gaze of the left eye on a basis of the right gaze information and the left gaze information.

The present invention in its second aspect provides an electronic device configured to control a display apparatus of an optical see-through type that is removably mountable on a head of a user, the electronic device including at least one memory and at least one processor, wherein a virtual object corresponding to an object and displayed for a right eye and a left eye is displayed at different display positions among a first case where the user is a first user and a distance from the user to the object is a first distance, a second case where the user is the first user and the distance from the user to the object is a second distance, a third case where the user is a second user and the distance from the user to the object is the first distance, and a fourth case where the user is the second user and the distance from the user to the object is the second distance; and a difference in the display position between the first case and the second case is different from a difference in the display position between the third case and the fourth case.

The present invention in its third aspect provides a control method of an electronic device, including: acquiring right gaze information related to a gaze of a right eye of a user that wears a display apparatus of an optical see-through type on a head and left gaze information related to a gaze of a left eye of the user; and acquiring, as information on personal differences, correlation information related to correlation between the gaze of the right eye and the gaze of the left eye on a basis of the right gaze information and the left gaze information.

The present invention in its fourth aspect provides a non-transitory computer readable medium that stores a program, wherein the program causes a computer to execute the control method.

Further features of the present invention will become apparent from the following description of exemplary embodiments with reference to the attached drawings.

BRIEF DESCRIPTION OF THE DRAWINGS

FIG. 21 illustrates an information management method according to the second embodiment;

DESCRIPTION OF THE EMBODIMENTS

First Embodiment

A first embodiment of the present invention will be described. While the present invention is applied to a display apparatus of an optical see-through type in the following description, the present invention is also applicable to an electronic device that is separate from a display apparatus, such as a controller or a personal computer that can communicate with a display apparatus, for example.

Configuration

Figure 1A:
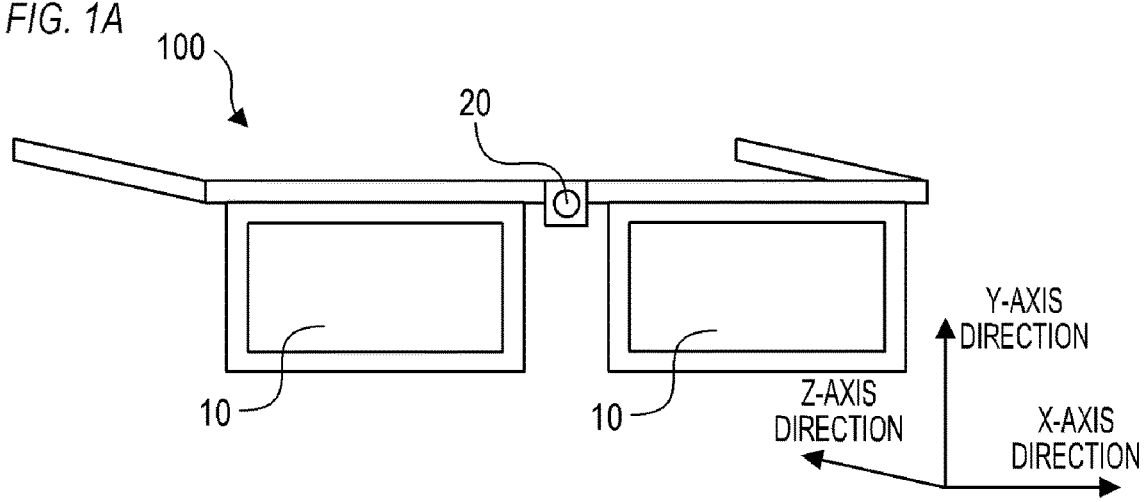
FIGS. 1A and 1B illustrate the appearance of a display apparatus according to a first embodiment.
Figure 1B:
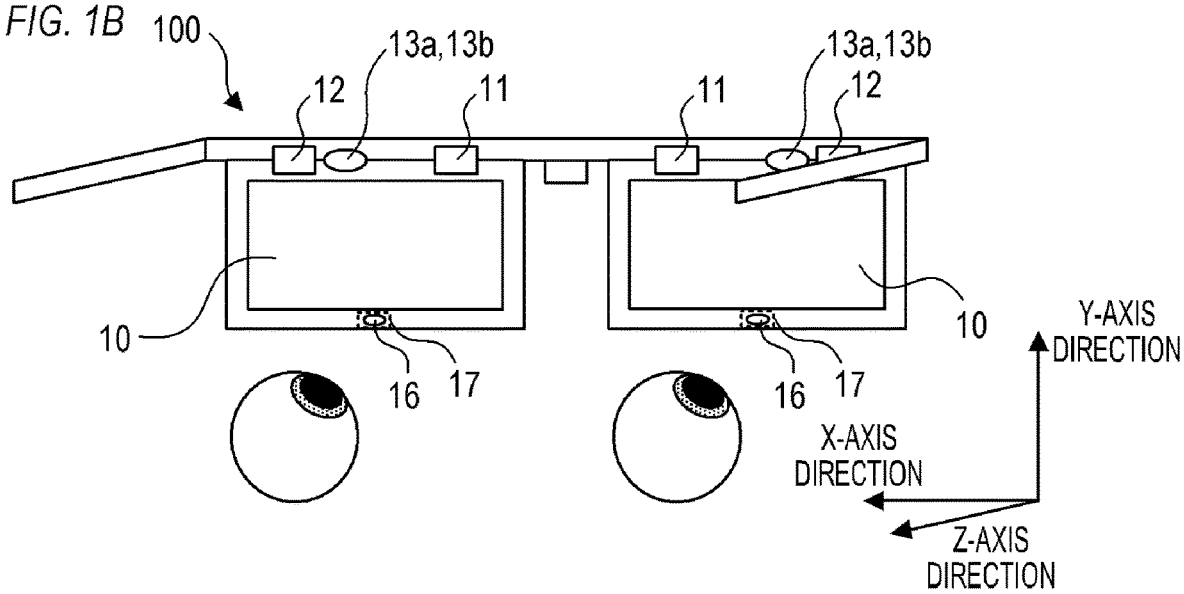

FIGS. 1A and 1B illustrate the appearance of a display apparatus 100 according to the first embodiment. FIG. 1A is a front perspective view, and FIG. 1B is a back perspective view. The display apparatus 100 is a display apparatus of an optical see-through type, which is a type of a head-mounted display (HMD) that is removably mountable on a head and a glass-type device that uses mixed reality (MR) or augmented reality (AR). The display apparatus 100 can individually detect the line of sight (gaze) of a right eye and the line of sight (gaze) of a left eye of a user that wears the display apparatus 100 on the head. Hereinafter, the user that wears the display apparatus 100 on the head will be referred to simply as a "user".

Lenses 10 are optical members that face the eyes of the user. The user can visually recognize the outside world through the lenses 10. Display devices 11 display a virtual object (a virtual image of a virtual object) for the two eyes (both the right eye and the left eye) of the user through control (display control) by a central processing unit (CPU) 2 to be discussed later. The user can see the displayed virtual object as if the virtual object existed in the outside world. Light source drive circuits 12 drive light sources 13a and 13b. The light sources 13a and 13b are a light source that illuminates an eye of the user, such as an infrared-emitting diode that emits infrared light that is not sensed by the user, for example. A part of the light emitted from the light sources 13a and 13b and reflected by the eyes of the user is concentrated on eye imaging elements 17 by light receiving lenses 16. These members are provided for each of the right eye and the left eye. For example, a right imaging element that images the right eye and a left imaging element that images the left eye are provided as the eye imaging elements 17.

An outside world imaging unit 20 includes an imaging element, and images a sight of the outside world in a direction in which the user directs his/her face.

Figure 2:
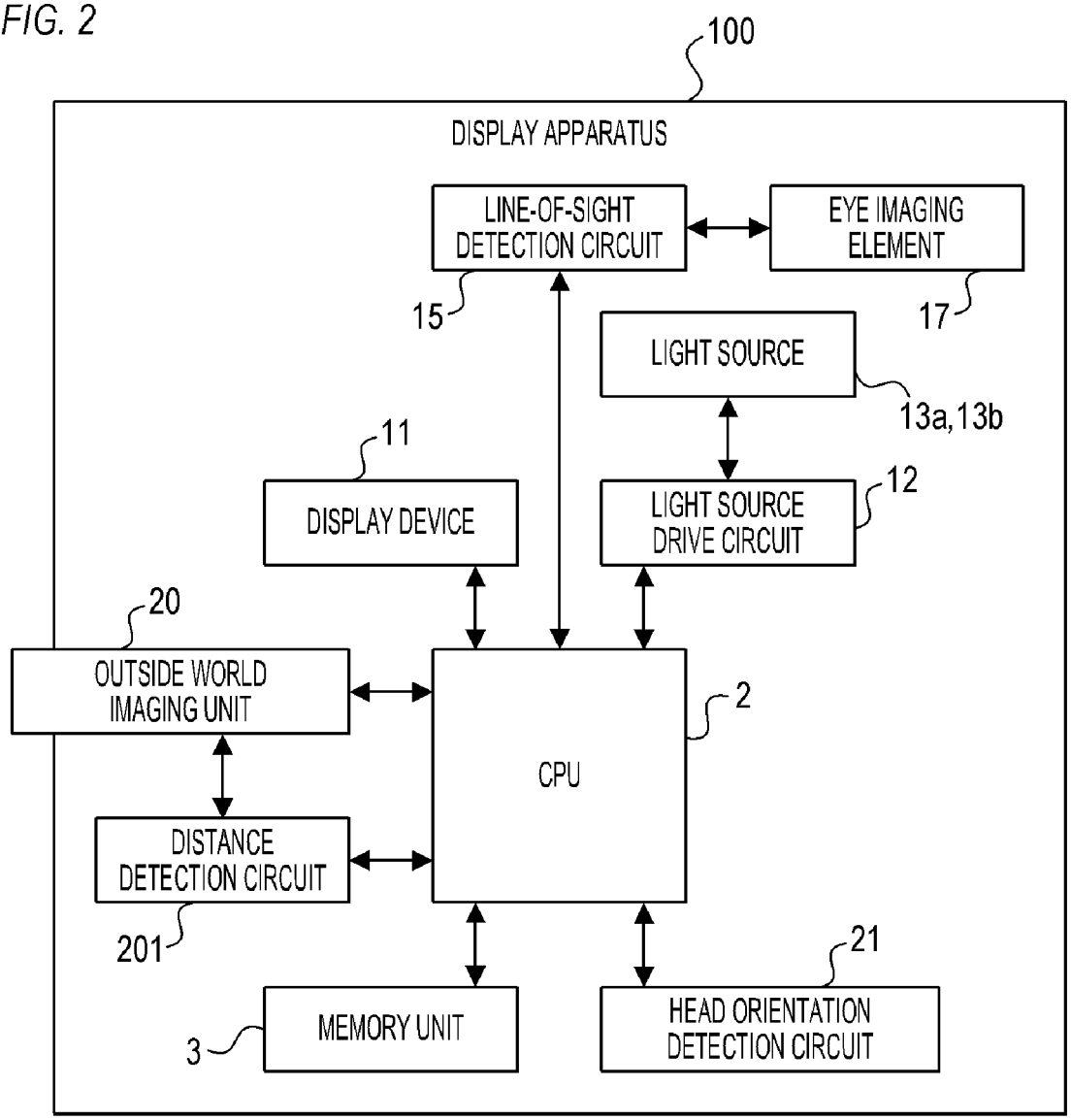
FIG. 2 is a block diagram of the display apparatus according to the first embodiment.

FIG. 2 is a block diagram illustrating the electric configuration of the display apparatus 100. The CPU 2 is a central processing unit of a microcomputer provided in the display apparatus 100, and controls the entire display apparatus 100. The display devices 11, the light source drive circuits 12, a line-of-sight (gaze) detection circuit 15, the outside world imaging unit 20, a distance detection circuit 201, a head orientation detection circuit 21, a memory unit 3, etc. are connected to the CPU 2.

The memory unit 3 has a function of storing video signals from the eye imaging elements 17 and the outside world imaging unit 20 and a function of storing line-of-sight correction parameters for correcting personal differences in the lines of sight to be discussed later.

The line-of-sight detection circuit 15 performs an analog-to-digital (A/D) conversion of outputs (eye image obtained by imaging the eye) from the eye imaging elements 17 with optical images of the eyes formed on the eye imaging elements 17, and transmits the results of the conversion to the CPU 2. The CPU 2 extracts feature points that are necessary to detect lines of sight from the eye image in accordance with a predetermined algorithm to be discussed later, and detects lines of sight of the user on the basis of the positions of the feature points. For example, the CPU 2 acquires right line-of-sight information related to the line of sight of the right eye on the basis of a right-eye image obtained by the right imaging element, and acquires left line-of-sight information related to the line of sight of the left eye on the basis of a left-eye image obtained by the left imaging element.

The display apparatus 100 can control the display devices 11 so as to display, as a user interface (UI), information related to a real object that the user is gazing at in accordance with the result of the line-of-sight detection (line-of-sight information, point-of-gaze information). The real object is an object that actually exists in the outside world (real space), and is also an object of the outside world imaging unit 20.

The distance detection circuit 201 performs an A/D conversion of signal voltages from a plurality of detection elements (a plurality of pixels) for phase difference detection included in an imaging element (charge-coupled device (CCD)) in the outside world imaging unit 20, and sends the result of the conversion to the CPU 2. The CPU 2 computes the distance to the real object (object) corresponding to distance detection points on the basis of signals from the plurality of detection elements. This technique is well known in the art as image plane phase-difference detection autofocus (AF). In the first embodiment, by way of example, the distance detection points are provided at 180 locations on the image plane corresponding to 180 locations indicated in the field of view in FIG. 6A (the range that can be seen by the user through the lenses 10, or the imaging range of the outside world imaging unit 20). In this manner, the CPU 2 measures (estimates) the distance from the user (display apparatus 100) to the real object (distance measurement) by controlling the distance detection circuit 201.

Figure 6A:
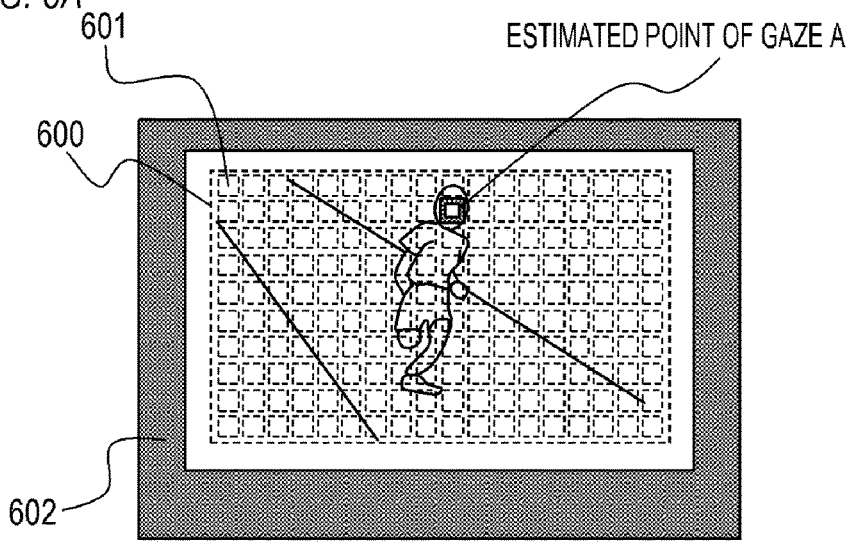
FIGS. 6A to 6C illustrate a field of view according to the first embodiment.

FIG. 6A illustrates the field of view of the user, and illustrates a state in which the display device 11 is operating. As illustrated in FIG. 6A, the field of view of the user includes a distance detection region 600 composed of 180 partial regions 601, a field-of-view mask 602, etc. The 180 partial regions 601 correspond to the distance detection points on the image plane of the outside world imaging unit 20. The display device 11 displays a frame etc. in a partial region corresponding to a present point of gaze A (estimated position), among the 180 partial regions 601. The point of gaze may also be taken as a position to which a line of sight is directed, a position seen by the user, a line-of-sight position, a position of gaze, etc.

The head orientation detection circuit 21 is constituted by an acceleration sensor etc., and sends a detection signal to the CPU 2. The CPU 2 analyzes the detection signal, and detects the orientation (e.g. the amount of tilt) of the head of the user. In this manner, the CPU 2 measures (estimates) the orientation of the head of the user (the orientation of the display apparatus 100) (head measurement) by controlling the head orientation detection circuit 21.

Line-of-sight Detection Operation

Figure 3:
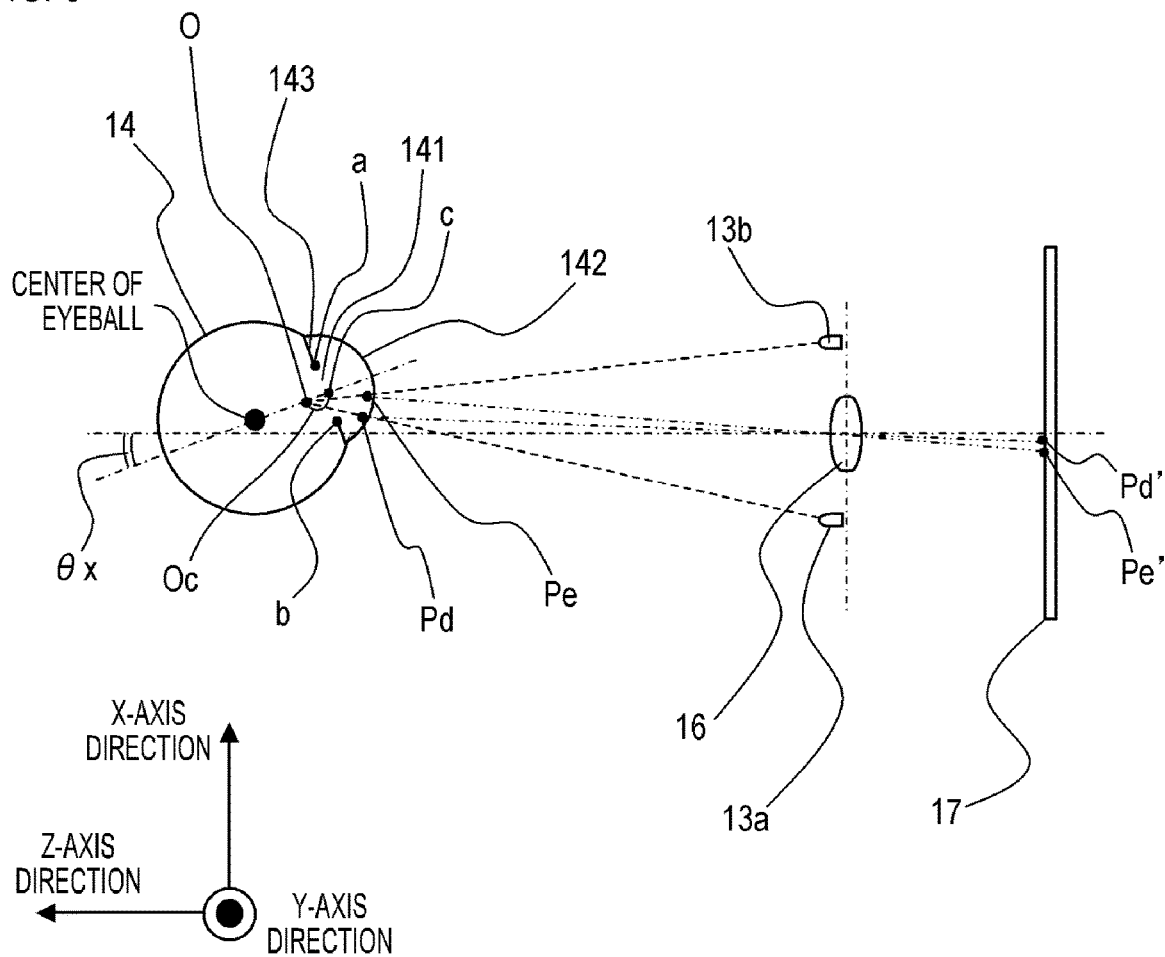
FIG. 3 illustrates the principle of a line-of-sight detection method according to the first embodiment.
Figure 4A:
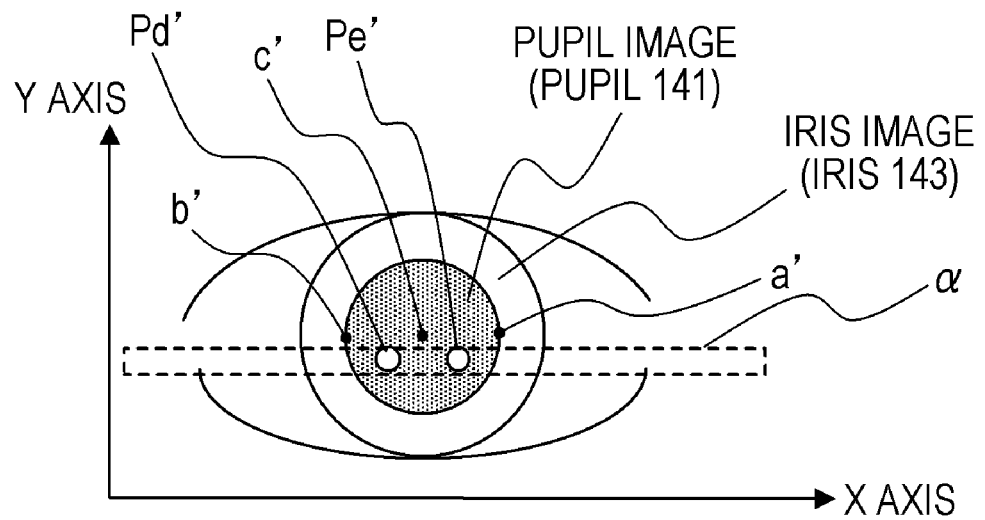
FIG. 4A illustrates an eye image according to the first embodiment.
Figure 4B:
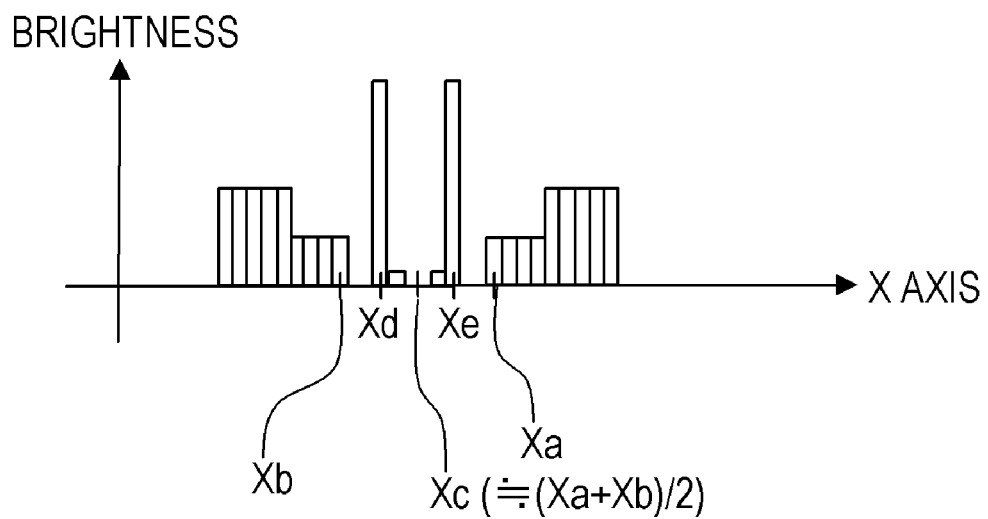
FIG. 4B illustrates the brightness distribution of the eye image according to the first embodiment.
Figure 5:
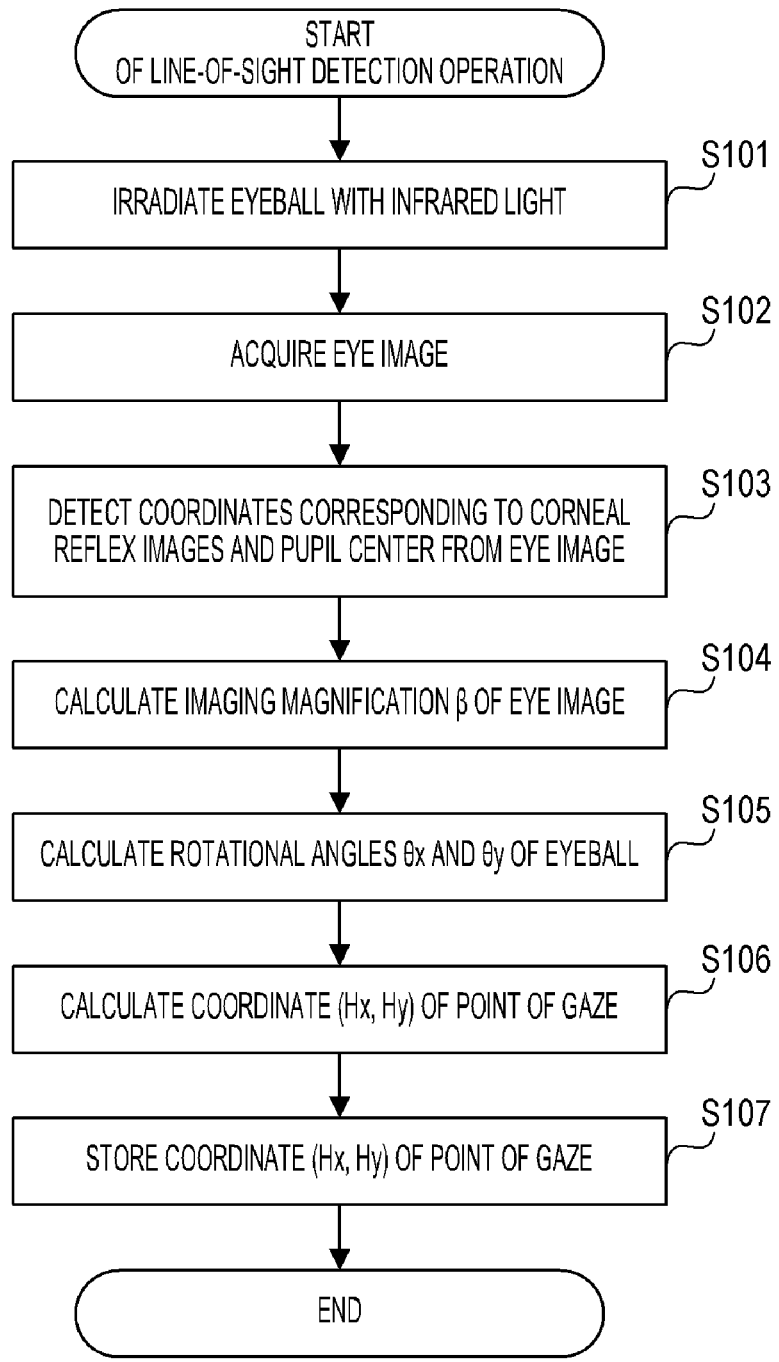
FIG. 5 is a flowchart of line-of-sight detection operation according to the first embodiment.

A line-of-sight detection method will be described with reference to FIGS. 3, 4A, 4B, and 5. Both the line of sight of the right eye and the line of sight of the left eye are detected by the following line-of-sight detection method. FIG. 3 is a schematic view of an optical system for line-of-sight detection, illustrating the principle of the line-of-sight detection method. FIG. 4A is a schematic view of an eye image (an optical image projected to the eye imaging element 17) captured by the eye imaging element 17. FIG. 4B indicates the intensity of an output from a CCD in the eye imaging element 17. FIG. 5 is a schematic flowchart of a line-of-sight detection operation.

When the line-of-sight detection operation is started, the CPU 2 controls the light sources 13a and 13b so as to emit infrared light toward the eyeball 14 of the user in step S101 in FIG. 5. Optical images of the eyes of the user illuminated with infrared light are formed on the eye imaging elements 17 through the light receiving lenses 16, and subjected to a photoelectric conversion performed by the eye imaging elements 17. Consequently, an electric signal for the eye image that can be processed is obtained.

In step S102, the CPU 2 acquires the eye image (eye image signal; electric signal for the eye image) from the eye imaging elements 17 via the line-of-sight detection circuit 15.

In step S103, the CPU 2 detects the coordinates of points corresponding to corneal reflex images Pd and Pe for the light sources 13a and 13b and a pupil center c on the basis of the eye image acquired in step S102.

The infrared light emitted from the light sources 13a and 13b illuminates a cornea 142 of an eyeball 14 of the user. At this time, the corneal reflex images Pd and Pe formed by a part of the infrared light reflected by the surface of the cornea 142 are concentrated by the light receiving lens 16, and formed on the eye imaging element 17 as corneal reflex images Pd' and Pe' in the eye image. Similarly, light pencils from end portions a and b of the pupil 141 are also formed on the eye imaging element 17 as pupil end images a' and b' in the eye image.

FIG. 4B illustrates brightness information (brightness distribution) in a region a in the eye image in FIG. 4A. In FIG. 4B, the horizontal direction and the vertical direction of the eye image are defined as "X-axis direction" and "Y-axis direction", respectively, and the brightness distribution in the X-axis direction is illustrated. In the first embodiment, the coordinates of the corneal reflex images Pd' and Pe' in the X-axis direction (horizontal direction) are defined as Xd and Xe, respectively, and the coordinates of the pupil end images a' and b' in the X-axis direction are defined as Xa and Xb, respectively. As illustrated in FIG. 4B, a significantly high level of brightness is obtained at the coordinates Xd and Xe of the corneal reflex images Pd' and Pe', respectively. A significantly low level of brightness is obtained in a region from the coordinate Xa to the coordinate Xb, which corresponds to the region of the pupil 141 (the region of a pupil image formed on the eye imaging element 17 by light pencils from the pupil 141), excluding the coordinates Xd and Xe. A middle level of brightness between the above two levels of brightness is obtained in the region of an iris 143 on the outer side of the pupil 141 (the region of an iris image formed on the outer side of the pupil image by light pencils from the iris 143). Specifically, a middle level of brightness between the above two levels of brightness is obtained in a region in which the X coordinate (the coordinate in the X-axis direction) is larger than the coordinate Xa and a region in which the X coordinate is smaller than the coordinate Xb.

The X coordinates Xd and Xe of the corneal reflex images Pd' and Pe', respectively, and the X coordinates Xa and Xb of the pupil end images a' and b', respectively, are obtained from the brightness distribution illustrated in FIG. 4B. Specifically, coordinates with significantly high brightness can be obtained as the coordinates of the corneal reflex images Pd' and Pe', and coordinates with significantly low brightness can be obtained as the coordinates of the pupil end images a' and b'. In the case where a rotational angle Ox of the optical axis of the eyeball 14 with respect to the optical axis of the light receiving lens 16 is small, a coordinate Xc of a pupil center image c' (the center of the pupil image) formed on the eye imaging element 17 by light pencils from the pupil center c can be represented as Xc (Xa+Xb)/2. That is, the coordinate Xc of the pupil center image c' can be calculated from the X coordinates Xa and Xb of the pupil end images a' and b', respectively. The coordinates of the corneal reflex images Pd' and Pe' and the coordinate of the pupil center image c' can be estimated in this manner.

In step S104, the CPU 2 calculates an imaging magnification R of the eye image. The imaging magnification R is a magnification determined in accordance with the position of the eyeball 14 with respect to the light receiving lens 16, and can be calculated using a function of the spacing (Xd−Xe) between the corneal reflex images Pd' and Pe'.

In step S105, the CPU 2 calculates the rotational angle of the optical axis of the eyeball 14 with respect to the optical axis of the light receiving lens 16. The X coordinate of the midpoint between the corneal reflex image Pd and the corneal reflex image Pe and the X coordinate of a center of curvature O of the cornea 142 substantially coincide with each other. Therefore, when the standard distance from the center of curvature O of the cornea 142 to the center c of the pupil 141 is defined as Oc, the rotational angle θx of the eyeball 14 within the Z-X plane (a plane that is perpendicular to the Y axis) can be calculated by the following formula 1. A rotational angle θy of the eyeball 14 within the Z-Y plane (a plane that is perpendicular to the X axis) also can be calculated by the same method as the method of calculating the rotational angle θx.

$$\beta \times Oc \times \text{SIN } \theta x \approx \{(Xd+Xe)/2\} - Xc \ldots \quad \text{(Formula 1)}$$

In step S106, the CPU 2 estimates the point of gaze by the user on the lens 10 using the rotational angles Ox and Oy calculated in step S105. When the coordinate (Hx, Hy) of the point of gaze is a coordinate corresponding to the pupil center c, the coordinate (Hx, Hy) of the point of gaze can be calculated by the following formulas 2 and 3.

$$Hx = m \times (Ax \times \theta x + Bx) \ldots \quad \text{(Formula 2)}$$

$$Hy = m \times (Ay \times \theta y + By) \ldots \quad \text{(Formula 3)}$$

The parameter m in the formulas 2 and 3 is a conversion coefficient for converting the rotational angles θx and θy into a coordinate corresponding to the pupil center c on the lens 10. The parameter m is determined in advance, and stored in the memory unit 3. The parameters Ax, Bx, Ay, and By are line-of-sight correction parameters for correcting personal differences in the lines of sight, and are acquired by performing calibration work to be discussed later. The line-of-sight correction parameters Ax, Bx, Ay, and By are stored in the memory unit 3 before line-of-sight detection operation is started.

In step S107, the CPU 2 stores the coordinate (Hx, Hy) of the point of gaze in the memory unit 3, and ends the line-of-sight detection operation.

The line-of-sight detection method is not limited to the above method, and may be any method of acquiring line-of-sight information from an eye image, for example. The final line-of-sight information may be information that indicates the direction of the line of sight, rather than information that indicates the point of gaze. For example, a process of obtaining a rotational angle (Ax×θx+Bx or Ay×θy+By) without obtaining the coordinate (Hx, Hy) of the point of gaze may be performed.

Necessity for Calibration Work

As discussed earlier, the point of gaze can be estimated by acquiring the rotational angles θx and θy of the eyeball 14 from the eye image through the line-of-sight detection operation and performing a coordinate conversion of the position of the pupil center c to a position on the lens 10.

Figure 6B:
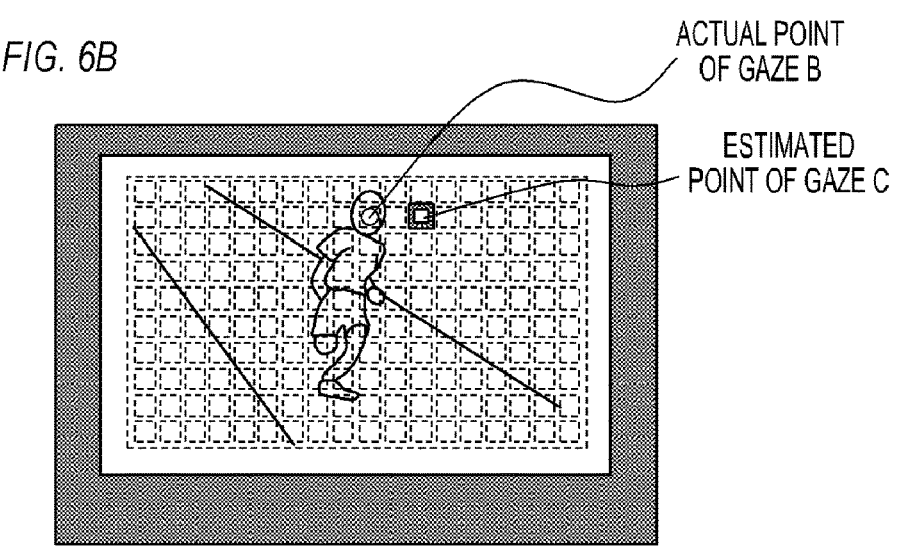

However, the point of gaze cannot be estimated precisely because of a factor such as personal differences in the shape of human eyeball. Specifically, a shift may be caused between an actual point of gaze B and an estimated point of gaze C, as illustrated in FIG. 6B, if the line-of-sight correction parameters Ax, Ay, Bx, and By are not adjusted to values that are suitable to the user. In FIG. 6B, the display apparatus 100 has erroneously estimated that the background is being gazed at, while the user is gazing at the person.

Thus, it is necessary to acquire line-of-sight correction parameters Ax, Ay, Bx, and By that are suitable to the user and store such parameters in the display apparatus 100, by performing calibration work before normal use of the display apparatus 100.

Figure 6C:
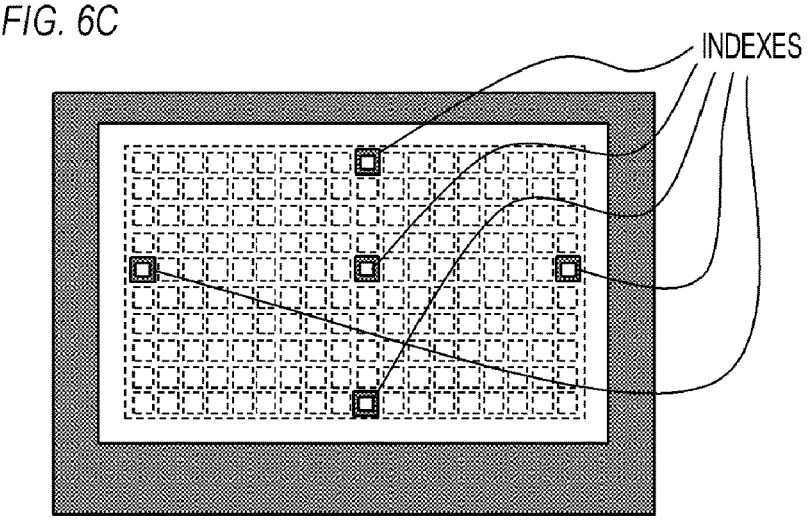

Hitherto, calibration work has been performed by displaying a plurality of indexes at different positions as illustrated in FIG. 6C and causing a user to see the indexes before normal use of the display apparatus 100. There is known a technique known in which line-of-sight detection operation is performed when the user gazes at the indexes and line-of-sight correction parameters Ax, Ay, Bx, and By that are suitable to the user are determined on the basis of a plurality of calculated points of gaze (estimated positions) and the coordinates of the indexes.

How Virtual Object Appears

As discussed above, the user can visually recognize the outside world through the lenses 10, and can see a virtual object displayed by the display devices 11 as if the virtual object existed in the outside world. How the virtual object appears at that event will be described with reference to FIGS. 7A to 7C.

Figure 7A:
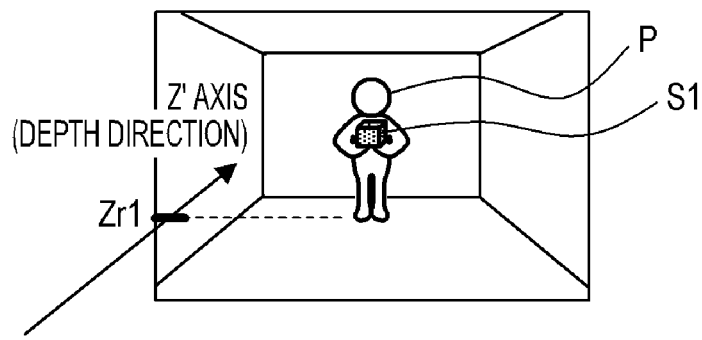
FIGS. 7A to 7C illustrate how a virtual object appears.

FIG. 7A illustrates how the virtual object ideally appears. In FIG. 7A, the user sees a person P in the outside world at the center of the view as if the person P held a box-like virtual object 51 being displayed. The user visually recognizes the outside world and the virtual object with two eyes, and combines two sights seen with the right eye and the left eye in the brain and recognizes a single sight such as that illustrated in FIG. 7A.

If there is a difference in the position in the depth direction (Z'-axis direction in FIG. 7A) between the real object that the user is gazing at and the virtual object desired to be superimposed on the real object, however, the user may not be able to see the virtual object with high quality. This will be described in detail with reference to FIGS. 7B and 7C.

Figure 7B:
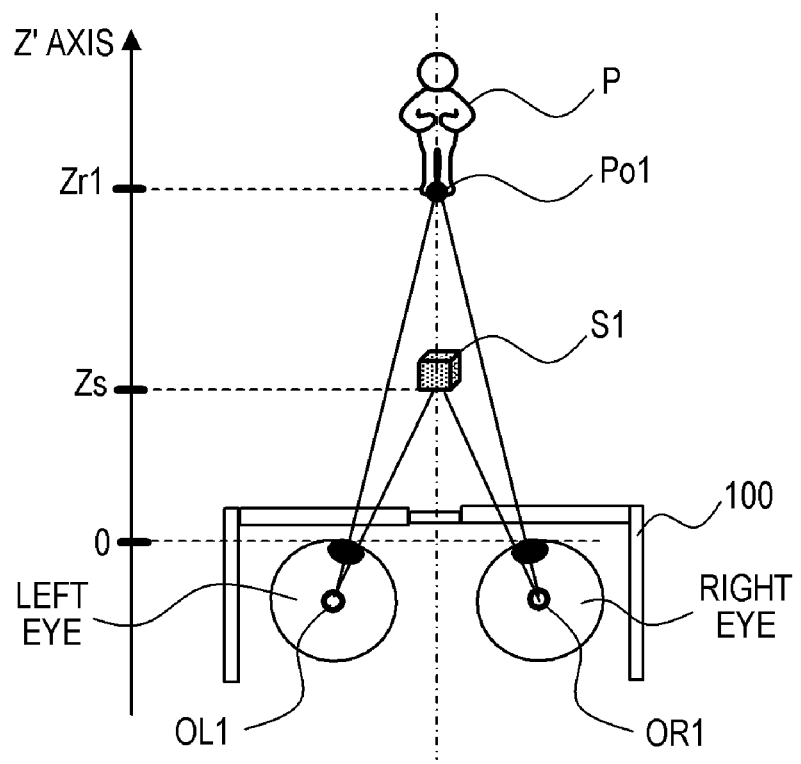

The virtual object is visually recognized by the user with a virtual image formed at a predetermined distance determined in accordance with the position and the performance of optical elements included in the display devices 11. FIG. 7B is a schematic view (bird's-eye view) illustrating how the user visually recognizes the person P as seen from above. In FIG. 7B, the person P is located at a position at a distance Zr1 from the user, and a virtual object S1 (virtual image) is formed at a position at a distance Zs from the user. The distances Zr1 and Zs are distances in the depth direction (Z'-axis direction). The real object that the user visually recognizes is not necessarily located at a distance that is equal to the distance Zs at which the virtual object is formed, and the person P is located at the distance Zr1 which is different from the distance Zs in FIG. 7B.

Figure 7C:
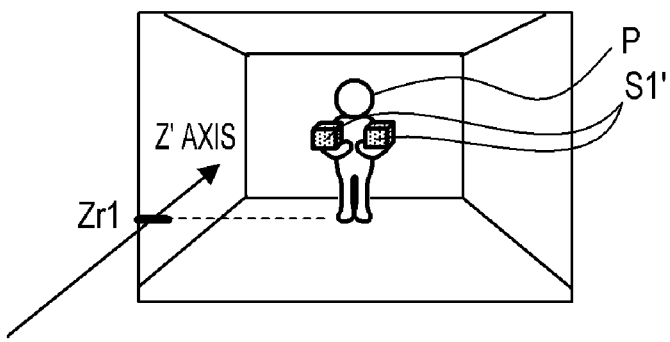

It is assumed that setting is made to dispose the virtual object S1 at the center of the view of the user as with the person P. FIG. 7B illustrates that state. It is assumed that the user gazes at the person P located at the distance Zr1 with two eyes. In that case, the two eyes of the user are rotated toward the center of the view such that the lines of sight of the two eyes are directed to the person P. The distance Zs from the user to the virtual object S1 is shorter than the distance Zr1 from the user to the person P. Therefore, the virtual object S1 is not on a line (the line of sight of the left eye) that connects between a left eye center OL1 of the user and a position Po1 of the person P or a line (the line of sight of the right eye) that connects between a right eye center OR1 of the user and the position Po1 of the person P, but is positioned between the two lines. In this state, as illustrated in FIG. 7C, the virtual object S1 which should appear to be superimposed on the person P is doubly seen (double view) separately as two objects S1' on the right and left to the user gazing at the person P with two eyes.

The double view discussed above is caused as the position of the person P and the position at which the virtual object S1 is formed are different from each other and the virtual object S1 is shifted from the lines of sight of the two eyes when the lines of sight are directed to the person P. In such a state, the person P to which the lines of sight of the two eyes are directed is recognized as a single object, and the virtual object which is shifted from the lines of sight of the two eyes is recognized as two separate object S1' on the right and left, as a result of the two sights seen with the right eye and the left eye being combined with each other in the brain of the user.

While a box-like virtual object to be held by a person has been described as an example, the virtual object is not limited thereto. For example, the virtual object may be a pointer (marker) to be displayed at a position (point of gaze) that the user is seeing. It is difficult to perform an operation to designate a position using a pointer when the pointer which indicates the point of gaze is doubly seen when the user is gazing at a real object.

Figure 8A:
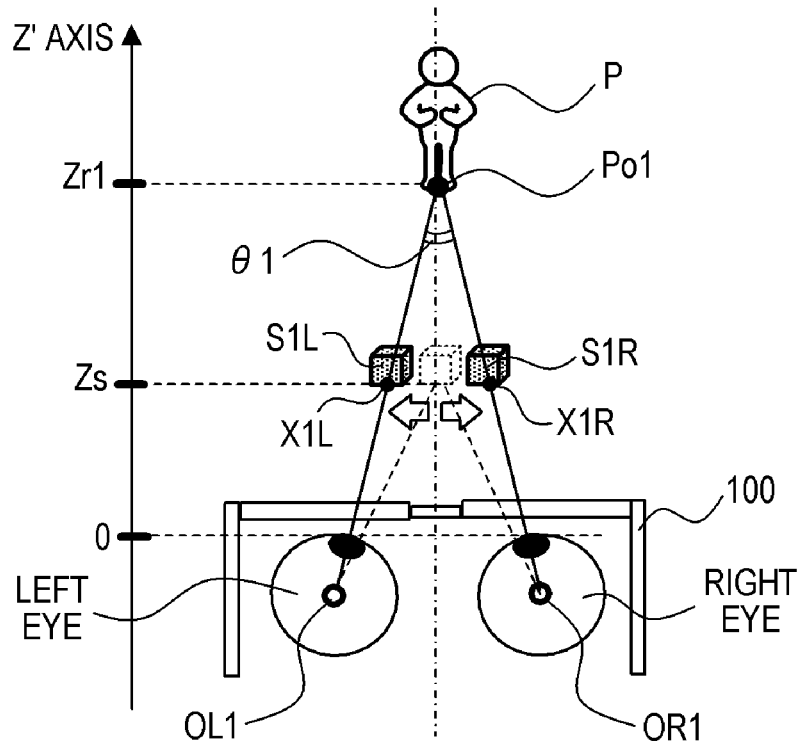
FIGS. 8A and 8B illustrate a method of displaying a virtual object according to the first embodiment.

Thus, in the first embodiment, the virtual object is displayed separately on the right and left so as to be on the lines of sight of the two eyes. That is, the virtual object is displayed with a parallax between the two eyes. For example, as illustrated in FIG. 8A, a virtual object S1L to be shown to the left eye is displayed at a position X1L on a line (the line of sight of the left eye) that connects between the left eye center OL1 and the position Po1 of the person P. Likewise, a virtual object S1R to be shown to the right eye is displayed at a position X1R on a line (the line of sight of the right eye) that connects between the right eye center OR1 and the position Po1 of the person P.

Figure 8B:
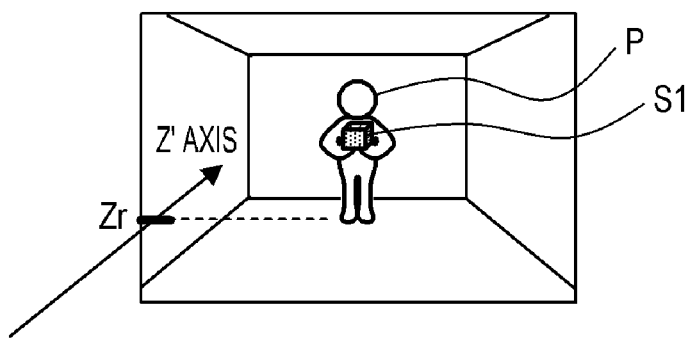

It is possible to suppress double view of the virtual object by adjusting the display positions of the virtual objects in this manner. This allows the user to see a sight in which the virtual object S1 is superimposed on the person P, without being displayed separately on the right and left, as illustrated in FIG. 8B, for example.

Necessity for Controlling Display Position in Accordance with Distance

It is necessary to adjust the display positions of the virtual objects in accordance with variations in the distance from the user to the real object (distance in the depth direction) in the case where such variations are caused. This will be described in detail with reference to FIG. 9.

Figure 9:
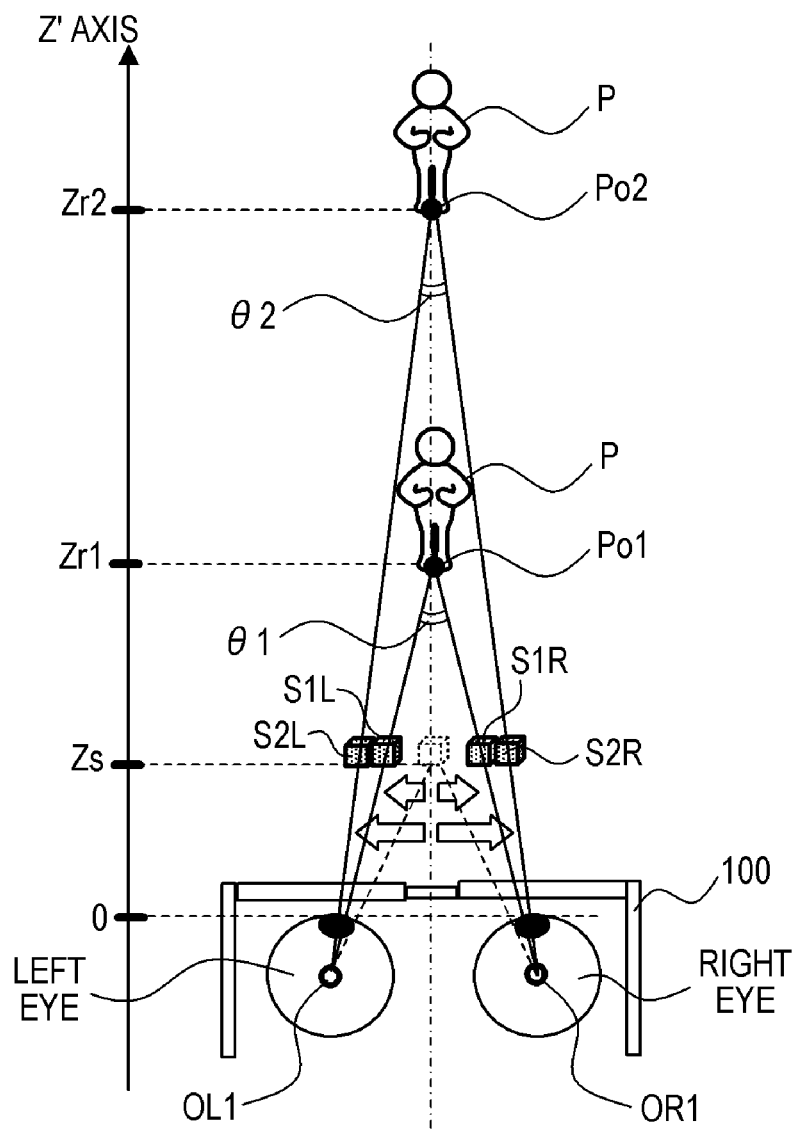
FIG. 9 illustrates the method of displaying a virtual object according to the first embodiment.

As illustrated in FIG. 9, in the case where the user gazes at the person P located at the distance Zr1, it is only necessary that the virtual object S1L to be shown to the left eye should be displayed at a position on a line (the line of sight of the left eye) that connects between the left eye center OL1 and the position Po1 of the person P. Likewise, it is only necessary that the virtual object S1R to be shown to the right eye should be displayed at a position on a line (the line of sight of the right eye) that connects between the right eye center OR1 and the position Po1 of the person P.

When the person P is moved to a position at a distance Zr2 that is longer than the distance Zr1, however, the virtual object is seen doubly with display of the virtual objects S1L and S1R discussed above. In that case, it is only necessary that a virtual object S2L to be shown to the left eye should be displayed at a position on a line (the line of sight of the left eye) that connects between the left eye center OL1 and a position Po2 of the person P. Likewise, it is only necessary that the virtual object S2R to be shown to the right eye should be displayed at a position on a line (the line of sight of the right eye) that connects between the right eye center OR1 and the position Po2 of the person P.

In this manner, it is necessary to form the virtual objects at positions farther away from the center of the view as the distance to the real object that the user is gazing at is longer. This makes it possible to show the user a high-quality image in which double view of the virtual object is suppressed, even if the distance to the real object is varied.

Necessity to Control Display Position in Accordance with Correlation between Lines of Sight of Two Eyes It is also necessary to adjust the display positions of the virtual objects in accordance with the correlation between the lines of sight of the two eyes (the correlation between the line of sight of the right eye and the line of sight of the left eye). Since there are personal differences in such correlation, it is necessary to adjust the display positions of the virtual objects for each person.

For example, an angle (convergence angle) formed between the line of sight of the right eye and the line of sight of the left eye depends on the spacing between the right eye and the left eye. Therefore, it is necessary to adjust the display positions of the virtual objects in accordance with the spacing between the right eye and the left eye. This will be described in detail with reference to FIG. 10.

Figure 10:
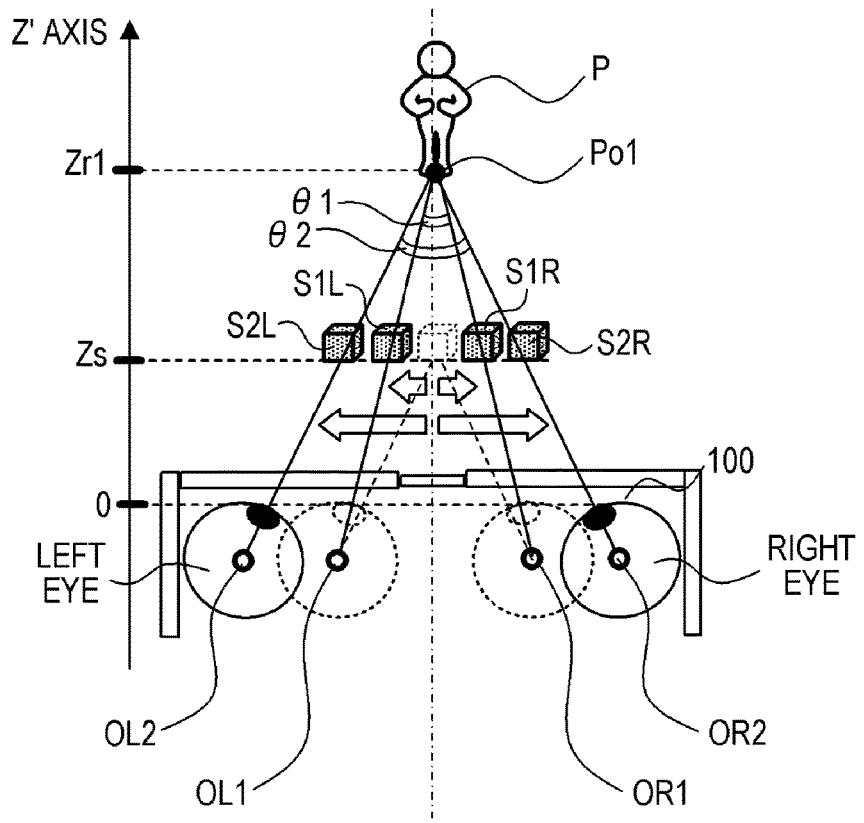
FIG. 10 illustrates the method of displaying a virtual object according to the first embodiment.

As illustrated in FIG. 10, for the left eye center OL1 and the right eye center OR1, it is only necessary that the virtual object S1L to be shown to the left eye should be displayed at a position on a line (the line of sight of the left eye) that connects between the left eye center OL1 and the position Po1 of the person P. Likewise, it is only necessary that the virtual object S1R to be shown to the right eye should be displayed at a position on a line (the line of sight of the right eye) that connects between the right eye center OR1 and the position Po1 of the person P.

For a left eye center OL2 and a right eye center OR2, however, double view of the virtual object is caused with display of the virtual objects S1L and S1R discussed above. In that case, it is only necessary that a virtual object S2L to be shown to the left eye should be displayed at a position on a line (the line of sight of the left eye) that connects between the left eye center OL2 and the position Po1 of the person P. Likewise, it is only necessary that a virtual object S2R to be shown to the right eye should be displayed at a position on a line (the line of sight of the right eye) that connects between the right eye center OR2 and the position Po1 of the person P.

In this manner, it is necessary to adjust the display positions of the virtual objects in accordance with the spacing between the right eye and the left eye. Since there are personal differences in the spacing between the right eye and the left eye, it is necessary to adjust the display positions of the virtual objects for each person.

The convergence angle also depends on the structure of the eyeball. Therefore, it is necessary to adjust the display positions of the virtual objects in accordance with the structure of the eyeball. Since there are personal differences in the structure of the eyeball, it is necessary to adjust the display positions of the virtual objects for each person. This will be described in detail with reference to FIGS. 11 and 12.

Figure 11:
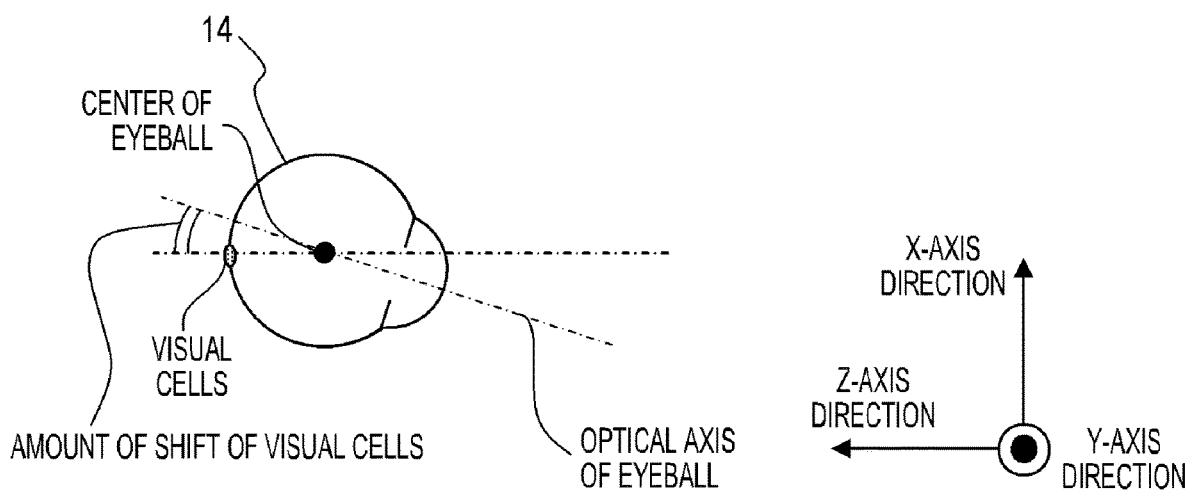
FIG. 11 illustrates the internal configuration of an eyeball according to the first embodiment.

As illustrated in FIG. 11, visual cells which are an organ that detects light in the eyeball are shifted from the optical axis of the eyeball. As a result, an angle formed between the optical axis of the eyeball and the Z axis is shifted from 0 degrees, in terms of the offset angle corresponding to the amount of shift of the visual cells from the optical axis of the eyeball, even when a human is looking forward (in a direction that is parallel to the Z-axis direction).

Figure 12:
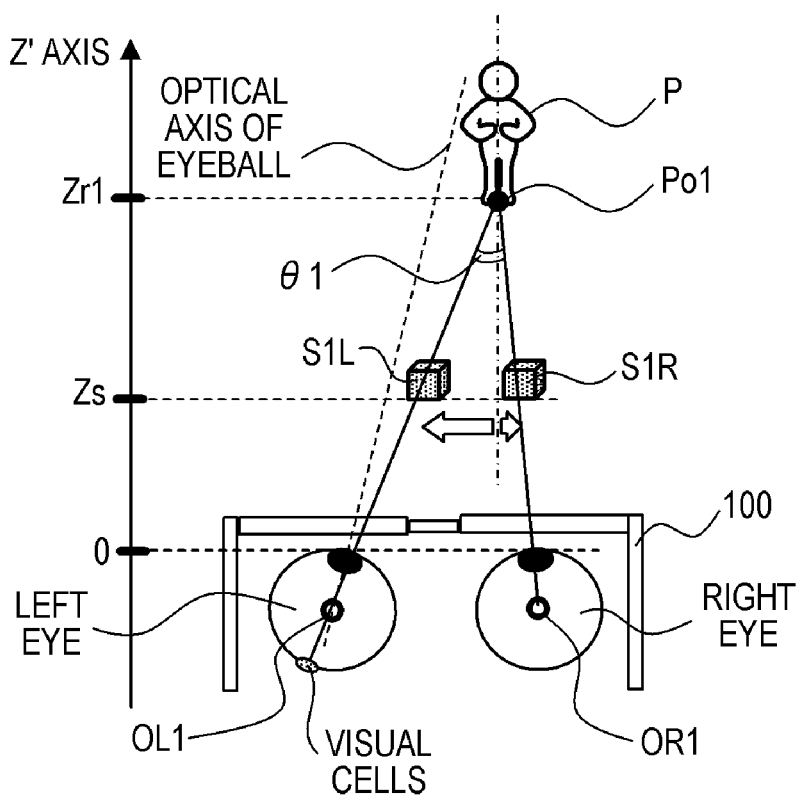
FIG. 12 illustrates the method of displaying a virtual object according to the first embodiment.

Thus, it is necessary to adjust the display positions of the virtual objects in accordance with the amount of shift of the visual cells. The amount of shift of the visual cells is occasionally different between the right eye and the left eye. In that case, it is necessary to shift the display positions of the virtual objects S1L and S2L to the right or left as illustrated in FIG. 12. Since there are personal differences in the amount of shift of the visual cells, it is necessary to adjust the display positions of the virtual objects for each person.

The convergence angle also depends on the pupil diameter (the size of the pupils). Therefore, it is necessary to adjust the display positions of the virtual objects in accordance with the pupil diameter. This will be described in detail with reference to FIGS. 13A to 13C.

Figure 13A:
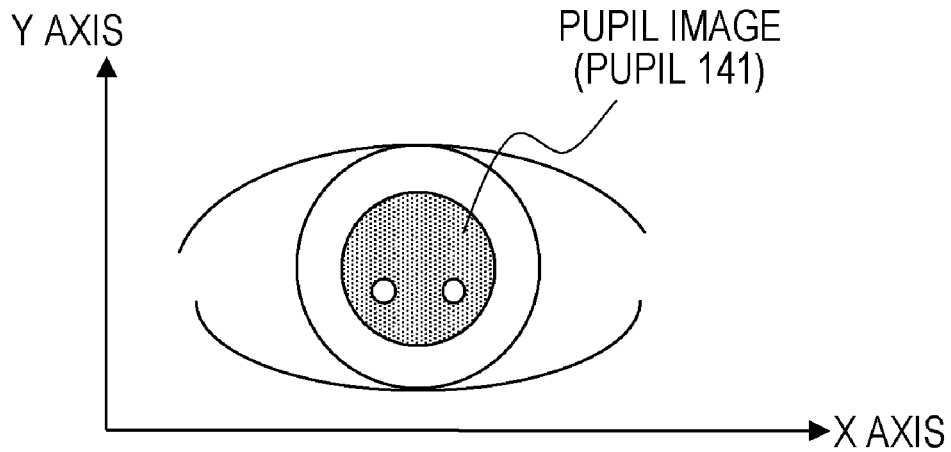
FIGS. 13A to 13C illustrate variations of a pupil according to the first embodiment.
Figure 13B:
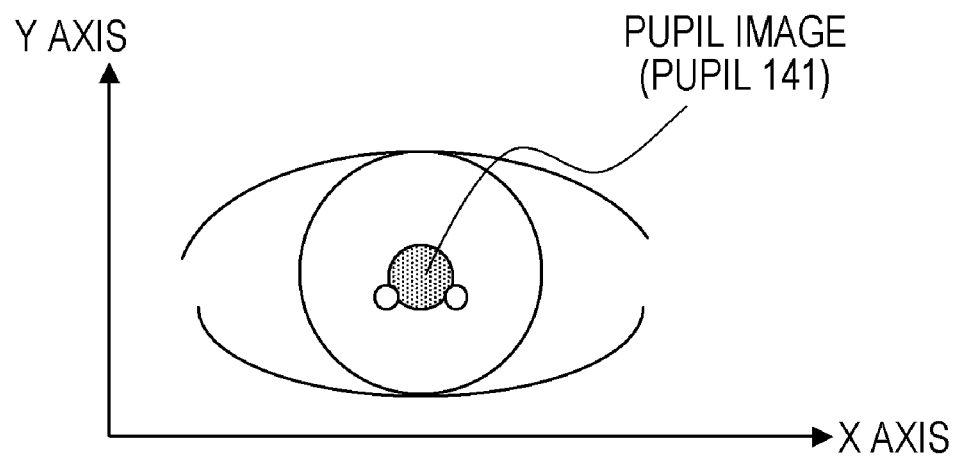
Figure 13C:
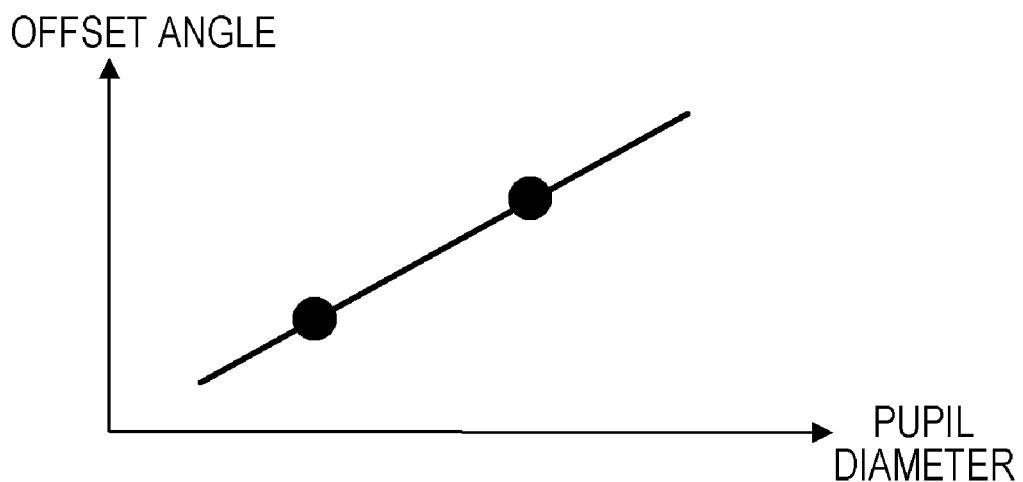

The pupil diameter of the user is varied as illustrated in FIGS. 13A and 13B when the user travels outdoor from an indoor place and light in the surroundings is varied, for example. When the pupil diameter is varied, parameters such as the offset angle discussed above are also varied as illustrated in FIG. 13C. While FIG. 13C illustrates an example in which the offset angle is increased linearly along with an increase in the pupil diameter, the correlation (properties) between the pupil diameter and the offset angle is not limited thereto. For example, the correlation between the pupil diameter and the offset angle may include a portion in which the offset angle is increased non-linearly along with an increase in the pupil diameter. The correlation between the pupil diameter and the offset angle may include a portion in which the offset angle is decreased in correspondence with an increase in the pupil diameter, or may include a portion in which the offset angle is not varied in correspondence with an increase in the pupil diameter.

Thus, it is necessary to adjust the display positions of the virtual objects in accordance with the pupil diameter. Since there are personal differences in the pupil diameter and the offset angle corresponding to the pupil diameter, it is necessary to adjust the display positions of the virtual objects for each person.

The convergence angle also depends on the orientation (tilt) of the human head. Therefore, it is necessary to adjust the display positions of the virtual objects in accordance with the orientation of the head. This will be described in detail with reference to FIGS. 14A and 14B.

Figure 14A:
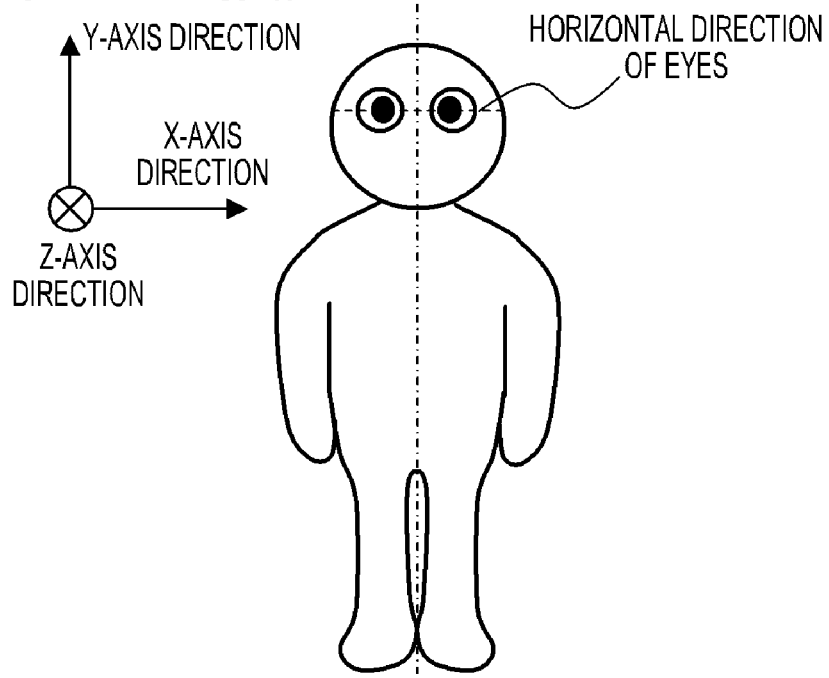
FIGS. 14A and 14B illustrate variations in the orientation of a head according to the first embodiment.
Figure 14B:
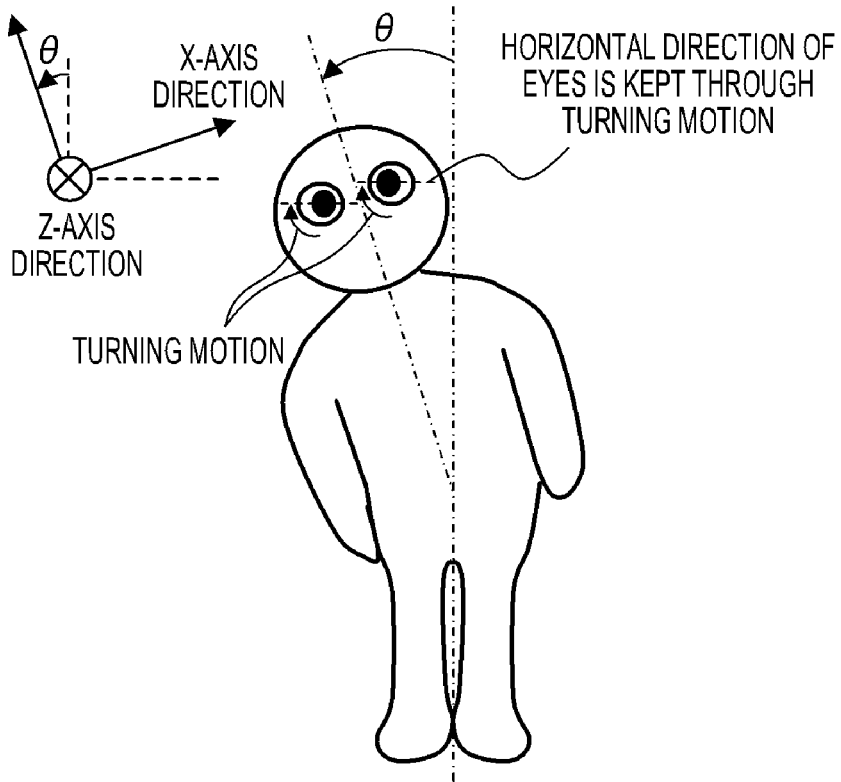

FIG. 14A illustrates a state in which a person is standing upright, and FIG. 14B illustrates a state in which the person has his/her head tilted by an angle of θ from the state in FIG. 14A. When a change is made from the state in FIG. 14A to the state in FIG. 14B, the head is tilted by the angle θ, and accordingly the display apparatus 100 (and the X, Y, and Z axes of the display apparatus 100) is also tilted by the angle θ. In contrast, the human's eyes are rotated (turning motion) about the optical axis of the eyeball in a direction that is opposite to the direction in which the head is tilted. Consequently, the horizontal direction of the eyes is maintained. When seen from the display apparatus 100 (the X, Y, and Z axes of the display apparatus 100), the eyes are rotated about the Z axis. As a result, the position of the visual cells relative to the display apparatus 100 is varied, and the offset angle discussed above is varied.

Thus, it is necessary to adjust the display positions of the virtual objects in accordance with the orientation of the head. Since there are personal differences in the offset angle corresponding to the orientation of the head, it is necessary to adjust the display positions of the virtual objects for each person.

Calibration Operation

Figure 15:
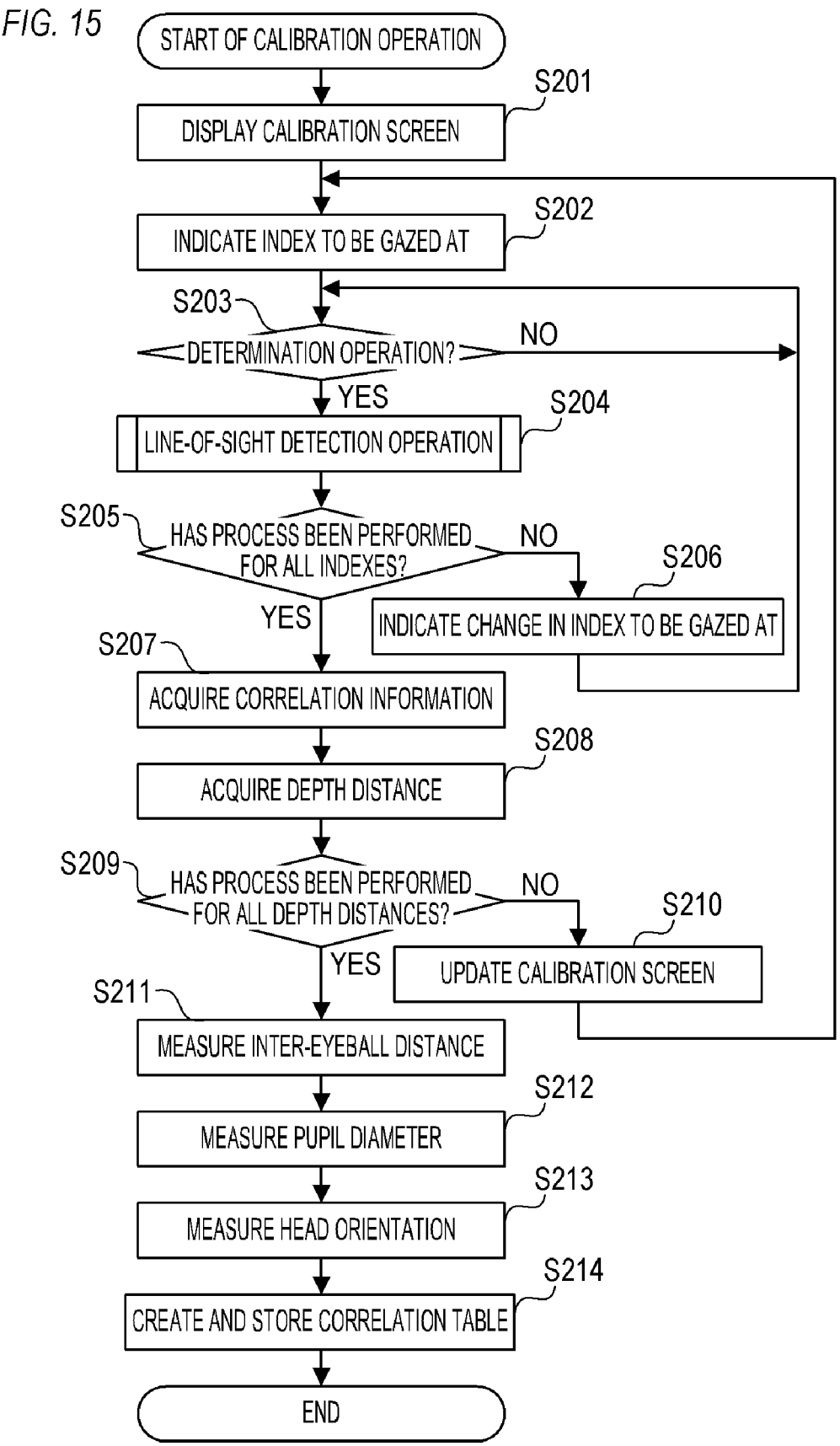
FIG. 15 is a flowchart of calibration operation according to the first embodiment.

Calibration operation will be described with reference to FIG. 15. FIG. 15 is a flowchart of the calibration operation. When the user wears the display apparatus 100 and provides an instruction to start calibration through a menu screen etc. displayed on the display apparatus 100, for example, the calibration operation in FIG. 15 is started.

Figure 16A:
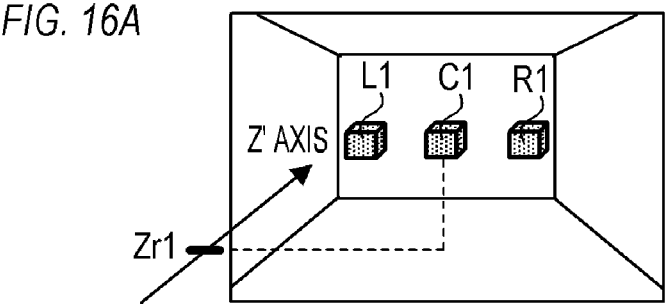
FIGS. 16A to 16D illustrate display for calibration according to the first embodiment.

In step S201, the CPU 2 controls the display devices 11 so as to display a calibration screen, including indexes for calibration, for the two eyes of the user. For example, indexes C1, R1, and L1 (virtual objects) are displayed as illustrated in FIG. 16A. The distances (distances in the depth direction, or depth distances) from the user to the indexes C1, R1, and L1 are equal to each other (depth distance Zr1).

Figure 16B:
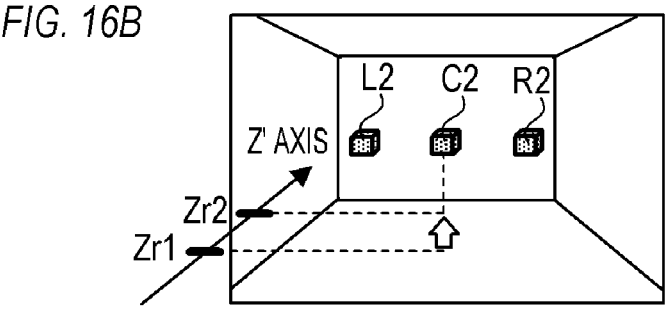
Figure 16C:
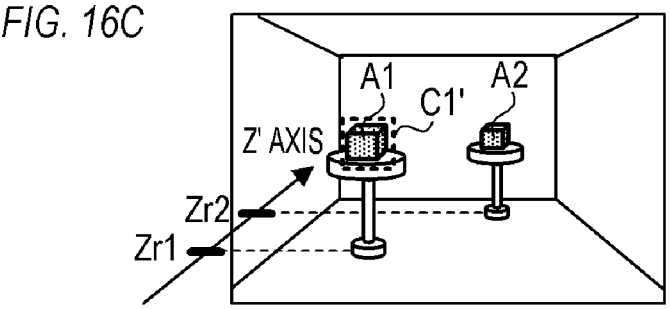

In step S202, the CPU 2 notifies the user of the location (index) to be gazed at. For example, the CPU 2 emphasizes the index to be gazed at by varying the shape, color, brightness, etc. of one of the indexes C1, R1, and L1 in FIG. 16A. The method of notifying the user of the index to be gazed at is not limited thereto. It is only necessary that the location to be gazed at should be indicated, and only the index to be gazed at may be displayed, for example. The user may be prompted to gaze at a real object A1 by displaying a frame C1' (virtual object) that indicates the real object A1 as illustrated in FIG. 16C.

In step S203, the CPU 2 determines whether or not the user has performed a determination operation. The determination operation is performed in order to inform the display apparatus 100 that the user is gazing at an index. Therefore, the determination operation is performed with the user seeing the index to be gazed at. Examples of the determination operation include an operation of a button of a controller connected to the display apparatus 100 through a wire or wirelessly. The determination operation is not specifically limited, and may be performed by continuously gazing at an index for more than a predetermined time, or may be a voice operation etc. The CPU 2 waits for a determination operation, and proceeds to step S204 when a determination operation is performed.

In step S204, the CPU 2 performs the line-of-sight detection operation in FIG. 5. The line-of-sight detection operation is performed for each of the right eye and the left eye. Consequently, right line-of-sight information (the result of the line-of-sight detection operation for the right eye) and left line-of-sight information (the result of the line-of-sight detection operation for the left eye) are acquired (line-of-sight acquisition).

In step S205, the CPU 2 determines whether or not the line-of-sight detection operation has been performed for all the indexes at an equal depth distance. For example, the CPU 2 determines whether or not the line-of-sight detection operation has been performed for all the indexes C1, R1, and L1 in FIG. 16A. The CPU 2 proceeds to step S206 in the case where there remains an index for which the line-of-sight detection operation has not been performed, and proceeds to step S207 in the case where the line-of-sight detection operation has been performed for all the indexes.

In step S206, the CPU 2 provides a notification of a change in the location (index) to be gazed at. In the case where the line-of-sight detection operation has been performed for the indexes C1 and R1, among the indexes C1, R1, and L1 in FIG. 16A, and the line-of-sight detection operation has not been performed for the index L1, for example, the CPU 2 emphasizes the index L1, and proceeds to step S203 and waits for a determination operation.

In step S207, the CPU 2 acquires (determines) the line-of-sight correction parameters Ax, Bx, Ay, and By discussed above on the basis of the result of the line-of-sight detection operation for all the indexes at an equal depth distance. The CPU 2 also acquires, as information on personal differences, correlation information (correlation data) related to the correlation between the line of sight of the right eye and the line of sight of the left eye on the basis of the right line-of-sight information (the result of the line-of-sight detection operation for the right eye) and the left line-of-sight information (the result of the line-of-sight detection operation for the left eye) (correlation acquisition). The correlation information is acquired in consideration of the line-of-sight correction parameters Ax, Bx, Ay, and By. For example, the CPU 2 acquires (calculates), as the correlation information, a convergence angle such as the angle θ1 in FIG. 8A on the basis of the rotational angles of the right eye and the left eye (Ax×θx+Bx and Ay×θy+By) determined in consideration of the line-of-sight correction parameters Ax, Bx, Ay, and By. The correlation information is acquired for each index. Consequently, the correlation between the in-plane position (the position within a plane that is perpendicular to the depth direction) and the correlation information can be acquired (determined).

In step S208, the CPU 2 acquires the depth distance to the location (index) that the user is gazing at. In the case where an index is displayed, the CPU 2 acquires an estimated distance to the index. In the case where the user is caused to gaze at a real object with display such as that illustrated in FIG. 16C, the CPU 2 detects the distance to the real object using the distance detection circuit 201.

In step S209, the CPU 2 determines whether or not correlation information has been acquired for all the estimated depth distances. The CPU 2 proceeds to step S210 in the case where there remains a depth distance for which correlation information has not been acquired, and proceeds to step S211 in the case where correlation information has been acquired for all the depth distances.

In step S210, the CPU 2 updates the calibration screen so as to vary the depth distance of the index. For example, the CPU 2 updates the screen from the display in FIG. 16A to the display in FIG. 16B. While the indexes C1, R1, and L1 in FIG. 16A are at the depth distance Zr1, indexes C2, R2, and L2 in FIG. 16B are at the depth distance Zr2 which is different from the depth distance Zr1. After that, the CPU 2 proceeds to step S202.

Figure 16D:
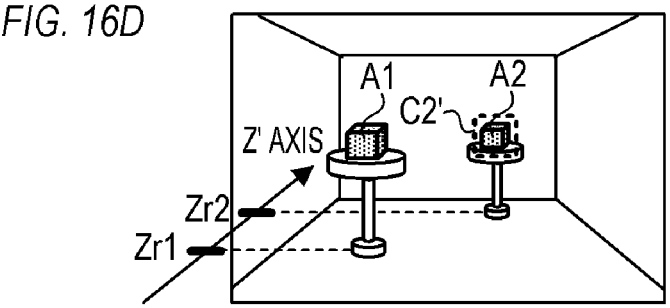

In the case where display such as that in FIG. 16C is made, the CPU 2 proceeds to step S202 by skipping step S210. In step S202, the CPU 2 updates the screen from the display in FIG. 16C to the display in FIG. 16D, for example. While the real object A1 at the depth distance Zr1 is emphasized by the frame C1' in FIG. 16C, a real object A2 at the depth distance Zr2 is emphasized by a frame C2' in FIG. 16D.

In this manner, when the user sees each of a plurality of indexes (objects) located at a plurality of depth distances, the CPU 2 acquires a plurality of pieces of correlation information respectively corresponding to the plurality of depth distances. For example, the CPU 2 acquires, as correlation information, angles θ1 and θ2 in FIG. 9 (a convergence angle for a case where the user gazes at an object located at the depth distance Zr1 and a convergence angle for a case where the user gazes at an object located at the depth distance Zr2).

In step S211, the CPU 2 measures (estimates) the spacing between the right eye and the left eye of the user (spacing measurement). For example, the CPU 2 calculates the spacing between the pupil center of the right eye and the pupil center of the left eye detected through the line-of-sight detection operation in step S204 as the spacing between the right eye and the left eye (inter-eyeball distance). The inter-eyeball distance can be calculated on the basis of the position (pixel position) of the pupil center of the right eye on the right-eye image, the position (pixel position) of the pupil center of the left eye on the left-eye image, the imaging magnification of the eye imaging elements 17, and the spacing between the right and left eye imaging elements 17.

In step S212, the CPU 2 measures (estimates) the pupil diameter (the size of the pupils) of the user (pupil measurement). For example, the CPU 2 calculates the pupil diameter on the basis of the position of end portions of the pupil detected through the line-of-sight detection operation in step S204.

In step S213, the CPU 2 measures (estimates) the head orientation (the orientation (tilt) of the head) of the user (head measurement). For example, the CPU 2 detects the head orientation using the head orientation detection circuit 21.

In step S214, the CPU 2 creates (generates) a correlation table that indicates the correlation among the depth distance, the inter-eyeball distance, the pupil diameter, the head orientation, and the correlation information on the basis of the acquired depth distance, inter-eyeball distance, pupil diameter, head orientation, and correlation information, and stores the correlation table in the memory unit 3. The calibration operation can be performed a plurality of times. In the second and subsequent calibration operations, a correlation table has been stored in the memory unit 3, and therefore the CPU 2 updates the correlation table in the memory unit 3 on the basis of the acquired depth distance, inter-eyeball distance, pupil diameter, head orientation, and correlation information. A plurality of pieces of correlation information corresponding to a plurality of inter-eyeball distances are acquired by repeatedly performing the calibration operation. A plurality of pieces of correlation information corresponding to a plurality of pupil diameters are acquired. A plurality of pieces of correlation information corresponding to a plurality of head orientations are acquired. The correlation table indicates the correlation between the in-plane position (the position within a plane that is perpendicular to the depth direction) and the correlation information (convergence angle) for each combination of the depth distance, the inter-eyeball distance, the pupil diameter, and the head orientation, for example. In the case where new correlation information is acquired for a combination for which correlation information has been acquired, the CPU 2 replaces the correlation information indicated in the correlation table with the new correlation information, or averages such pieces of correlation information. The correlation table may be stored for each person.

The CPU 2 stores the acquired line-of-sight correction parameters Ax, Bx, Ay, and By in the memory unit 3. The line-of-sight correction parameters Ax, Bx, Ay, and By stored in the memory unit 3 are updated (replaced or averaged), as appropriate, as with the correlation table stored in the memory unit 3. The line-of-sight correction parameters Ax, Bx, Ay, and By may be stored as parameters for each combination of the depth distance, the inter-eyeball distance, the pupil diameter, and the head orientation, or may be stored as parameters that do not depend on the depth distance, the inter-eyeball distance, the pupil diameter, or the head orientation. The line-of-sight correction parameters Ax, Bx, Ay, and By may be stored for each person.

Virtual Object Display Operation

Figure 17:
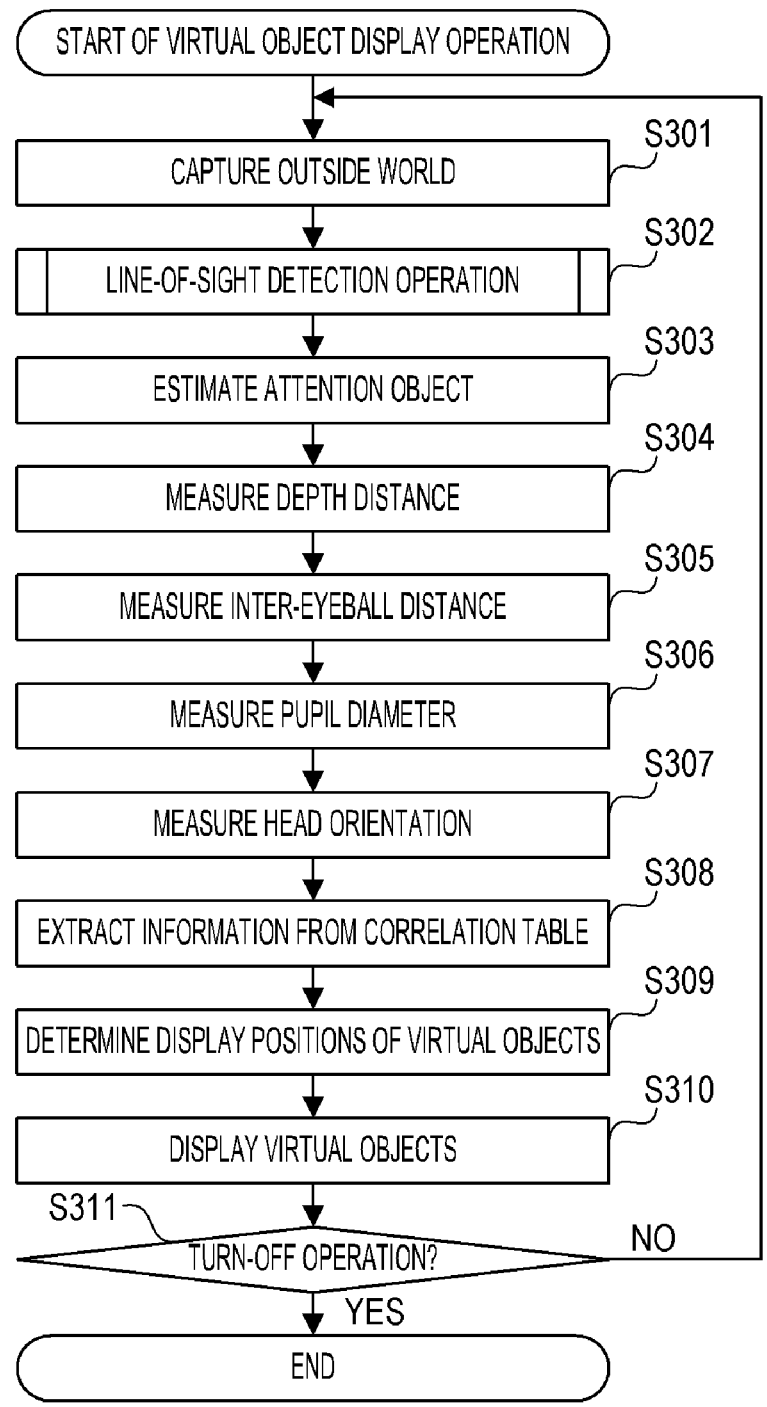
FIG. 17 is a flowchart of virtual object display operation according to the first embodiment.

Virtual object display operation to be performed after the calibration operation in FIG. 15 is performed will be described with reference to FIG. 17. FIG. 17 is a flowchart of the virtual object display operation. The virtual object display operation in FIG. 17 is started when the user wears the display apparatus 100 and the display apparatus 100 is turned on, for example.

In step S301, the CPU 2 controls the outside world imaging unit 20 so as to image (capture) the outside world.

In step S302, the CPU 2 performs the line-of-sight detection operation in FIG. 5. The line-of-sight detection operation is performed for each of the right eye and the left eye.

In step S303, the CPU 2 estimates a real object (attention object) drawing attention of the user. For example, the CPU 2 detects, as an attention object, an object (real object) corresponding to the point of gaze (position of gaze) estimated through the line-of-sight detection operation in step S302 from an outside world image captured by the outside world imaging unit 20. The method of estimating an attention object is not limited thereto, and a distance map for the entire outside world image may be created (generated) by the distance detection circuit 201, and an object that is the closest to the user may be detected as an attention object, for example. Alternatively, an object near the center of the outside world image may be simply detected as an attention object.

In step S304, the CPU 2 measures the depth distance to the attention object detected in step S302 using the distance detection circuit 201.

In step S305, the CPU 2 measures the inter-eyeball distance of the user by the same method as that in step S211 in FIG. 15.

In step S306, the CPU 2 measures the pupil diameter of the user by the same method as that in step S212 in FIG. 15.

In step S307, the CPU 2 measures the head orientation of the user by the same method as that in step S213 in FIG. 15.

In step S308, the CPU 2 extracts information corresponding to the information acquired in steps S304 to S307 (a combination of the depth distance, the inter-eyeball distance, the pupil diameter, and the head orientation) from the correlation table created through the calibration operation in FIG. 15. The extracted information is information on the correlation between the in-plane position (the position within a plane that is perpendicular to the depth direction) and the correlation information (convergence angle), for example. In the first embodiment, the user has been specified, and the correlation table and the line-of-sight correction parameters Ax, Bx, Ay, and By corresponding to the user are used.

In step S309, the CPU 2 determines the display positions of the virtual objects on the basis of the information extracted in step S308. For example, the CPU 2 acquires a convergence angle corresponding to the point of gaze (in-plane position) estimated through the line-of-sight detection operation in step S302 on the basis of the correlation between the in-plane position and the convergence angle. Then, the CPU 2 determines the display positions of the virtual objects on the basis of the acquired convergence angle such that the virtual objects are on the line of sight of the right eye and the line of sight of the left eye.

In step S310, the CPU 2 controls the display devices 11 so as to display the virtual objects for the two eyes of the user in accordance with the display positions determined in step S309.

With the processes in steps S301 to S310, the virtual objects are displayed for the right eye and the left eye with a parallax based on the correlation information (convergence angle) corresponding to the information acquired in steps S304 to S307 such that the virtual objects are visually recognized as superimposed on the attention object. While the depth distance, the inter-eyeball distance, the pupil diameter, and the head orientation are acquired in the calibration operation and the virtual object display operation, at least a part of such information may not be acquired.

In step S311, the CPU 2 determines whether or not the user has provided an instruction to turn off the display apparatus 100. In the case where the user has provided an instruction to turn off the display apparatus 100, the CPU 2 ends the virtual object display operation, and turns off the display apparatus 100. In the case where the user has not provided an instruction to turn off the display apparatus 100, the CPU 2 proceeds to step S301 after standing by for a predetermined time.

Operation Example

An operation example for a case where virtual objects are displayed by the method illustrated in FIG. 17 will be described. In the case where virtual objects are displayed by the method illustrated in FIG. 17, the display positions of the virtual objects are varied in accordance with the depth distance to an attention object, the inter-eyeball distance of the user, the pupil diameter of the user, and the head orientation of the user. Therefore, the operation described below is specifically performed in the case where virtual objects are displayed by the method illustrated in FIG. 17.

Two persons H1 and H2 each that wear a display apparatus of an optical see-through type on the head are instructed to see an object θ1 located at a first depth distance with two eyes, and thereafter instructed to see an object θ2 located at a second depth distance, which is different from the first depth distance, with two eyes. The display apparatus displays virtual objects for the two eyes of each user such that the virtual objects correspond to (are superimposed on) an object drawing attention of each user.

In the case where the following conditions are met, it can be determined that the process of changing the display positions of virtual objects in accordance with the depth distance is different between the persons, and it can be determined that the method illustrated in FIG. 17 is used.

The display positions of virtual objects are different among a first case where the person H1 sees the object θ1, a second case where the person H1 sees the object θ2, a third case where the person H2 sees the object θ1, and a fourth case where the person H2 sees the object θ2.

The difference in the display positions of virtual objects (the difference in the parallax, the difference in the deviation in the display positions) between the first case and the second case is different from the difference in the display positions of virtual objects between the third case and the fourth case.

The persons H1 and H2 may be real persons, or may be pseudo persons. For example, operation that is similar to that discussed above can be reproduced by mounting a display apparatus on a head model that has pseudo eyeball prepared using glass etc. The direction of the lines of sight of the pseudo eyeball can be adjusted by adjusting the angle of the pseudo eyeball.

It can be determined that the method illustrated in FIG. 17 is used in the case where at least one of the following conditions is met.

The display positions of virtual objects are different between the case of a first user and the case of a second user whose amount of shift of visual cells with respect to the optical axis of eyeball is different from that of the first user.

The display positions of virtual objects are different between the case of a third user and the case of a fourth user whose spacing between the right eye and the left eye is different from that of the third user.

The display positions of virtual objects are different between the case where the size of the pupil of the user is a first size and the case where the size of the pupil of the user is a second size that is different from the first size.

The display positions of virtual objects are different between the case where the orientation of the head of the user is a first orientation and the case where the orientation of the head of the user is a second orientation that is different from the first orientation.

Summary

With the first embodiment, as discussed above, it is possible to suppress double view of a virtual object displayed on a display apparatus of an optical see-through type by acquiring, as information on personal differences, correlation information related to the correlation between the line of sight of the right eye and the line of sight of the left eye. While a convergence angle (degrees) is used as the correlation information in the described example, this is not limiting, and a parallax of the virtual object may also be used, for example. The parallax may also be taken as the amount of shift (number of pixels or length (mm)) in the horizontal (right-left) direction between the display position of a virtual object for the right eye and the display position of a virtual object for the left eye. The correlation information may be information that enables identification of the deviation in the horizontal direction of a crossing point between the line of sight of the right eye and the line of sight of the left eye. For example, the correlation information may indicate, as a breakdown of the convergence angle, an angle formed between the line of sight of the right eye and the depth direction and an angle formed between the line of sight of the left eye and the depth direction.

Second Embodiment

A second embodiment of the present invention will be described. In the following, similarities (such as configuration and process) to the first embodiment will not be described, and differences from the first embodiment will be described. In the first embodiment, correlation information related to the correlation between the line of sight of the right eye and the line of sight of the left eye is acquired, and used to display a virtual object. Since there are personal differences in the correlation information, personal identification can be performed using the correlation information. An example in which the correlation information is used for personal identification is described using the second embodiment.

Personal Identification Operation

Figure 18:
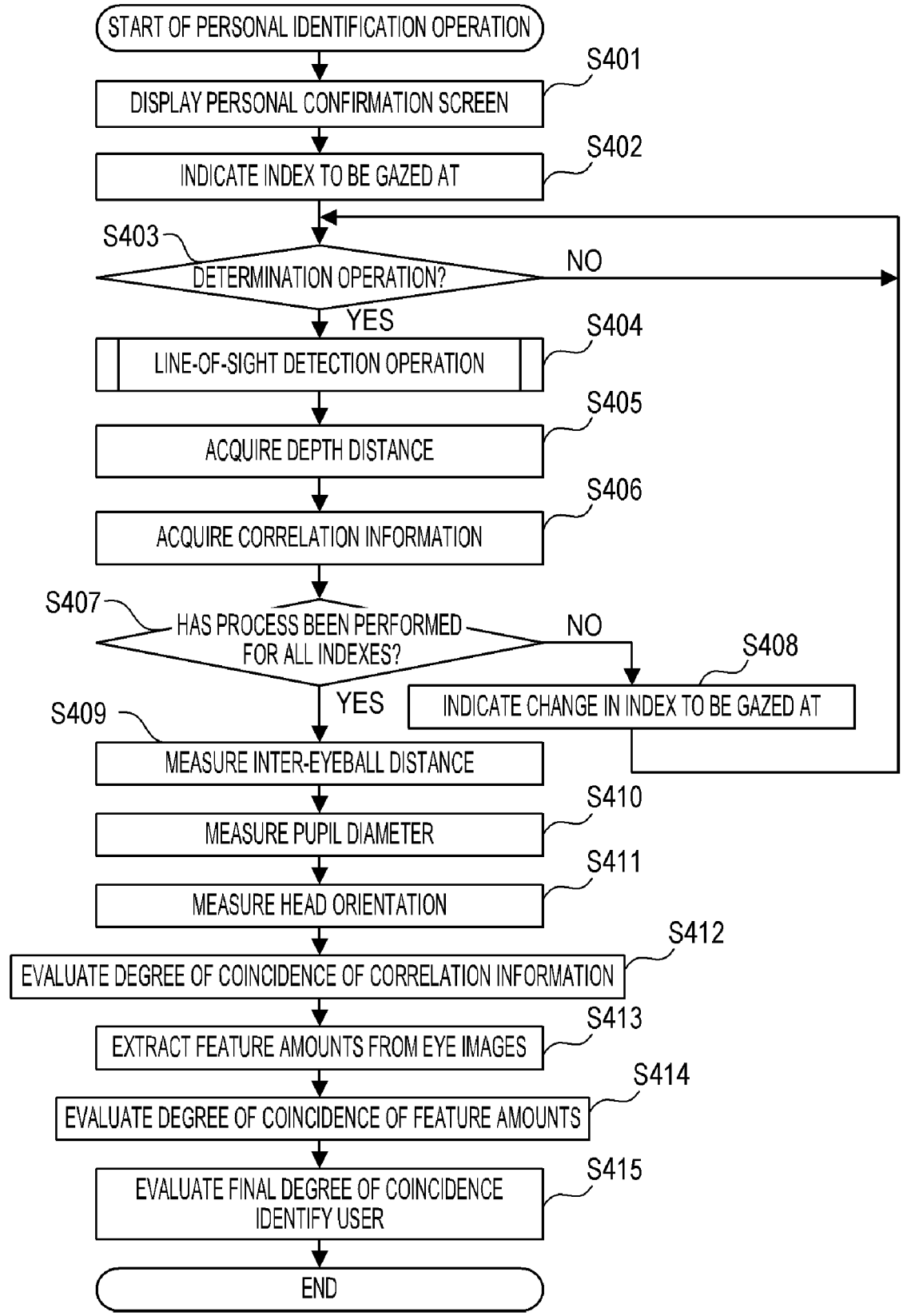
FIG. 18 is a flowchart of personal identification operation according to a second embodiment.

Personal identification operation will be described with reference to FIG. 18. FIG. 18 is a flowchart of the personal identification operation. The personal identification operation in FIG. 18 is started when the user wears the display apparatus 100 and the display apparatus 100 is turned on, for example. It is assumed that, in the second embodiment, a lock screen (personal confirmation screen) such as a log-in screen of a smartphone or a personal computer is displayed for locking and unlocking through the personal identification operation.

Figure 19A:
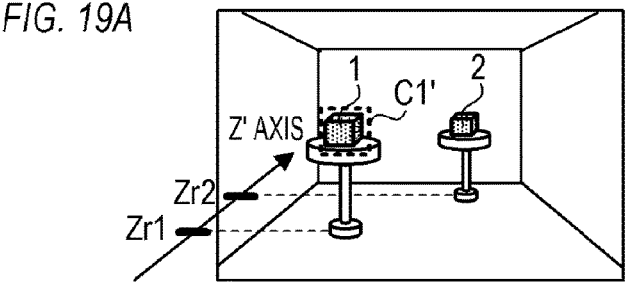
FIGS. 19A and 19B illustrate display for personal identification according to the second embodiment.

In step S401, the CPU 2 controls the display devices 11 as to display a personal confirmation screen, including indexes for personal identification, for the two eyes of the user. For example, indexes 1 and 2 at different depth distances are displayed as illustrated in FIG. 19A. The number of the indexes is not specifically limited.

In step S402, the CPU 2 notifies the user of an index to be gazed at. For example, the CPU 2 prompts the user to gaze at the index 1 by displaying a frame C1' that indicates the index 1 in FIG. 19A.

In step S403, the CPU 2 determines whether or not the user has performed a determination operation. The CPU 2 waits for a determination operation, and proceeds to step S404 when a determination operation is performed.

In step S404, the CPU 2 performs the line-of-sight detection operation in FIG. 5. The line-of-sight detection operation is performed for each of the right eye and the left eye.

Figure 20:
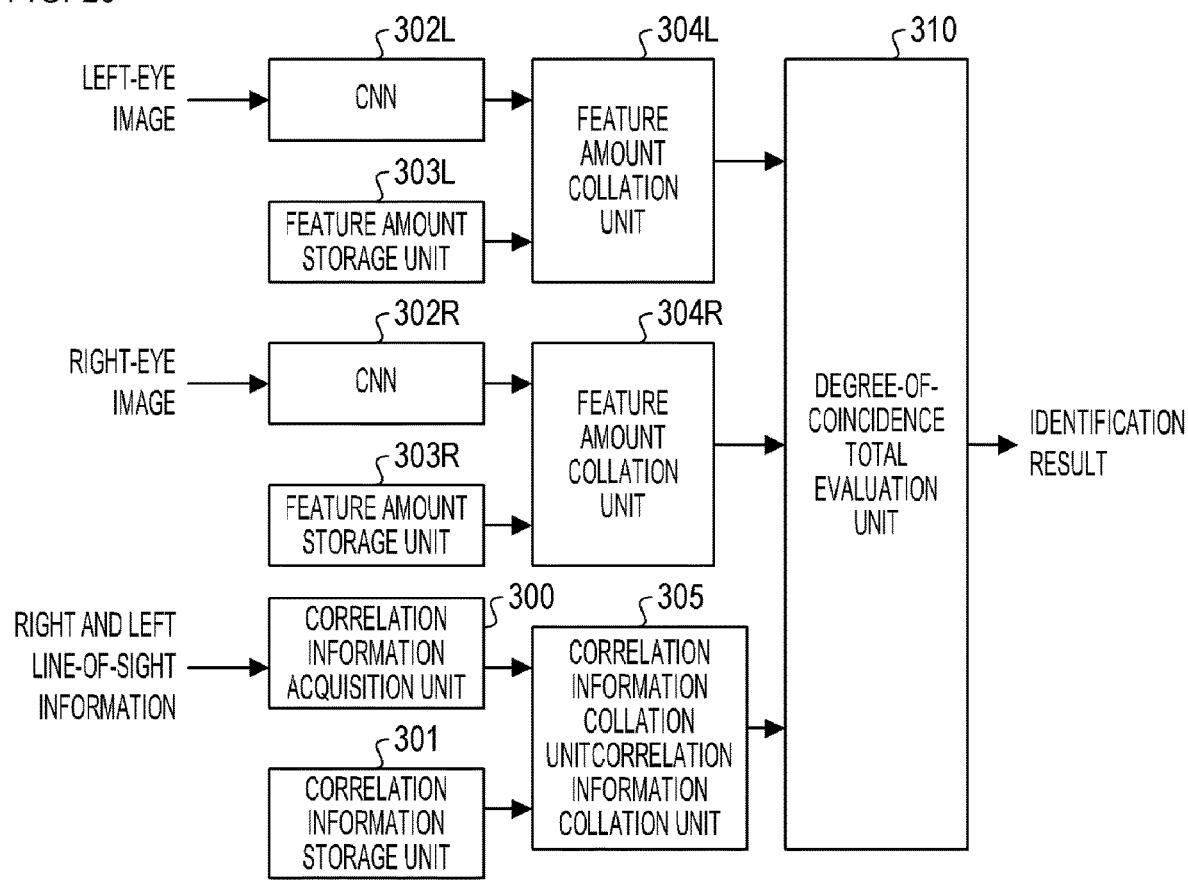
FIG. 20 is a block diagram illustrating the functional configuration for the personal identification operation according to the second embodiment.

In step S405 to step S411, processes of a correlation information acquisition unit 300 in FIG. 20 are performed. FIG. 20 is a block diagram illustrating the functional configuration for implementing the personal identification operation. The correlation information acquisition unit 300 acquires correlation information related to the correlation between the line of sight of the right eye and the line of sight of the left eye on the basis of right line-of-sight information (the result of the line-of-sight detection operation for the right eye) and left line-of-sight information (the result of the line-of-sight detection operation for the left eye) obtained in step S404. The correlation information acquisition unit 300 further acquires various information associated with the acquired correlation information.

In step S405, the CPU 2 acquires the depth distance to the index that the user is gazing at.

In step S406, the CPU 2 acquires, as information on personal differences, correlation information (e.g. a convergence angle) related to the correlation between the line of sight of the right eye and the line of sight of the left eye on the basis of the right line-of-sight information and the left line-of-sight information.

In step S407, the CPU 2 determines whether or not the line-of-sight detection operation has been performed for all the indexes. For example, the CPU 2 determines whether or not the line-of-sight detection operation has been performed for both the indexes 1 and 2 in FIG. 19A. The CPU 2 proceeds to step S408 in the case where there remains an index for which the line-of-sight detection operation has not been performed, and proceeds to step S409 in the case where the line-of-sight detection operation has been performed for all the indexes.

Figure 19B:
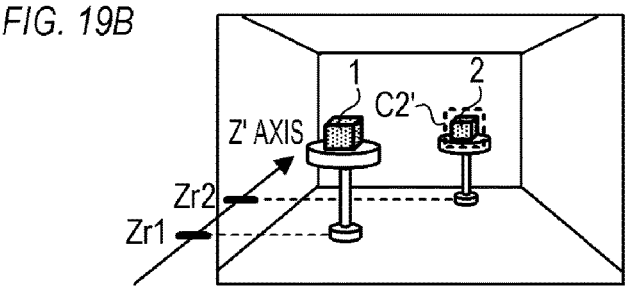

In step S408, the CPU 2 provides a notification of a change in the index to be gazed at. For example, the CPU 2 updates the screen from the display in FIG. 19A to the display in FIG. 19B, and proceeds to step S403 and waits for a determination operation. While the index 1 located at the depth distance Zr1 is emphasized by the frame C1' in FIG. 19A, the index 2 located at the depth distance Zr2 is emphasized by the frame C2' in FIG. 19B.

In step S409, the CPU 2 measures the inter-eyeball distance of the user.

In step S410, the CPU 2 measures the pupil diameter of the user.

In step S411, the CPU 2 measures the head orientation of the user.

In this manner, a combination of the depth distance, the inter-eyeball distance, the pupil diameter, the head orientation, and the correlation information (correlation information group) is acquired for each index (specific in-plane position) through the processes in steps S405 to S411. At least one of the depth distance, the inter-eyeball distance, the pupil diameter, and the head orientation may not be acquired.

In step S412, the CPU 2 reads a correlation table for a plurality of persons from the memory unit 3, and evaluates (calculates), for each person, the degree of coincidence (rate of coincidence) between the correlation table for the person and the correlation information group acquired in steps S405 to S411. The method of evaluating the degree of coincidence is not specifically limited. The degree of coincidence is high in the case where the correlation table includes a correlation information group that is equivalent to the correlation information group acquired in steps S405 to S411, and the degree of coincidence is low otherwise, for example. The process in step S412 corresponds to the process by a correlation information collation unit 305 in FIG. 20. The correlation information collation unit 305 evaluates the degree of coincidence for each person by collating the correlation information group acquired by the correlation information acquisition unit 300 and a correlation table stored in advance in a correlation information storage unit 301. The correlation tables for a plurality of persons are acquired through the calibration operation in FIG. 15.

In step S413, the CPU 2 extracts a feature amount from each of the right-eye image and the left-eye image obtained through the line-of-sight detection operation in step S404. The feature amount of the right-eye image is extracted by a convolutional neural network (CNN) 302R in FIG. 20, and the feature amount of the left-eye image is extracted by a CNN 302L in FIG. 20. The CNNs will be discussed in detail later.

In step S414, the CPU 2 reads feature amounts of the eyes of a plurality of persons from the memory unit 3, and evaluates, for each person, the degree of coincidence (rate of coincidence) between the feature amounts of the eyes of the person and the feature amounts extracted in step S413. The process in step S414 is performed for each of the right eye and the left eye. The process for the right eye corresponds to the process by a feature amount collation unit 304R in FIG. 20, and the process for the left eye corresponds to the process by a feature amount collation unit 304L in FIG. 20. The feature amount collation unit 304R evaluates the degree of coincidence for each person by collating the feature amount of the right eye extracted by the CNN 302R and a feature amount of the right eye stored in advance in a feature amount storage unit 303R. The feature amount collation unit 304L evaluates the degree of coincidence for each person by collating the feature amount of the left eye extracted by the CNN 302L and a feature amount of the left eye stored in advance in a feature amount storage unit 303L.

The correlation table for each person and the feature amounts of the eyes of each person may be managed individually, or may be managed integrally as illustrated in FIG. 21.

In step S415, the CPU 2 evaluates the final degree of coincidence for each person on the basis of the three types of degree of coincidence (the degree of coincidence of the feature amount of the right eye, the degree of coincidence of the feature amount of the left eye, and the degree of coincidence of the correlation information) obtained in steps S412 and S414. For example, the final degree of coincidence is calculated by totaling values obtained by multiplying the three types of degree of coincidence by a predetermined weighting factor. Then, the CPU 2 determines that the user is a person with the highest final degree of coincidence. After the user is identified, the virtual object display operation in FIG. 17 is started, for example. The identification may fail in the case where the final degree of coincidence does not exceed a predetermined threshold. The process in step S415 corresponds to the process by a degree-of-coincidence total evaluation unit 310. The degree-of-coincidence total evaluation unit 310 specifies (identifies) a person by totally evaluating the three types of degree of coincidence obtained from the feature amount collation unit 304R, the feature amount collation unit 304L, and the correlation information collation unit 305.

With the above method, the identification precision is improved by using not only the feature amount of the right eye and the feature amount of the left eye but also the correlation information related to the correlation between the two eyes (the correlation between the line of sight of the right eye and the line of sight of the left eye). The correlation information can be obtained precisely even if low-resolution imaging elements are used. Therefore, it is possible to achieve enhancement in the precision in authentication (render false authentication difficult) due to the addition of the correlation information while suppressing an increase in the cost of a personal identification device.

CNNs

The CNNs 302R and 302L will be described. Since the CNN 302R and the CNN 302L are similar in configuration to each other, the CNN 302L will be described below.

Figure 22:
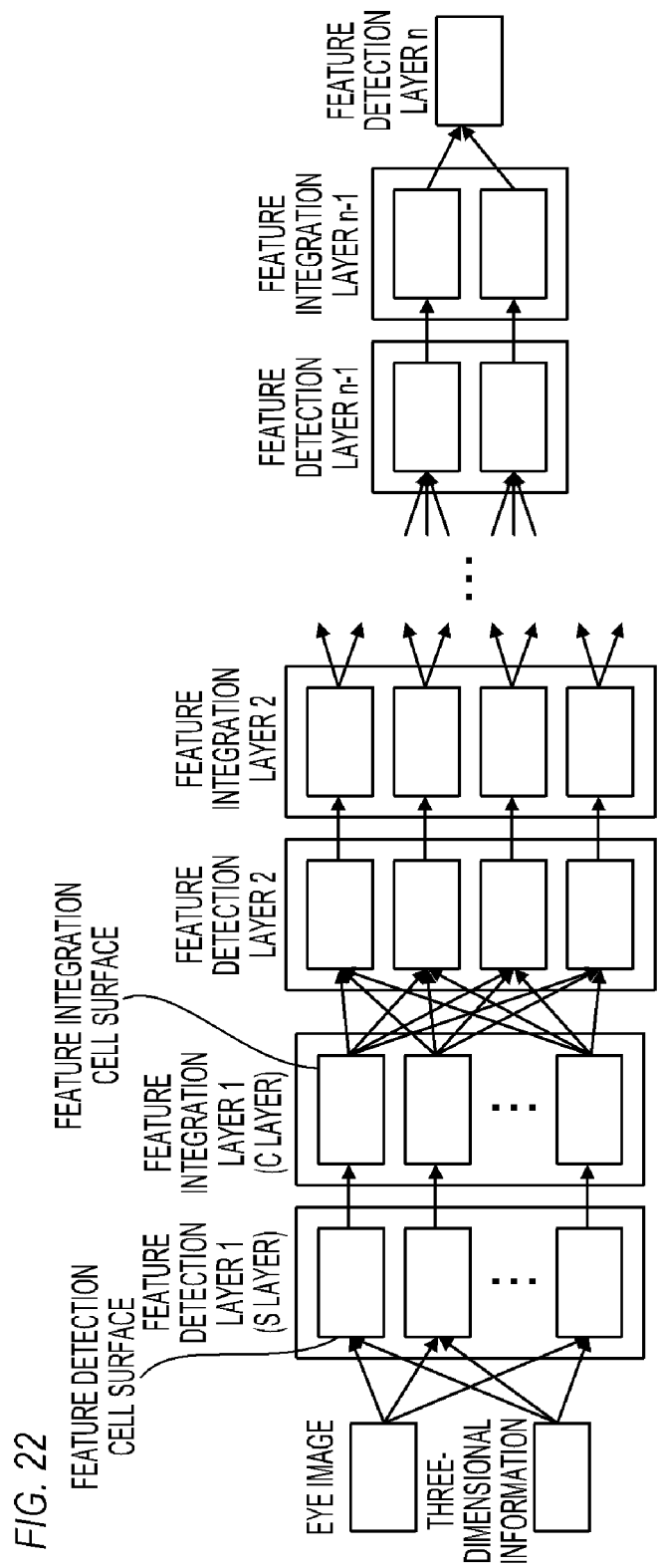
FIG. 22 illustrates the configuration of a convolutional neural network (CNN) according to the second embodiment.

FIG. 22 illustrates the configuration of the CNN 302L. The CNN 302L receives an eye image (left-eye image) and three-dimensional information on the eyeball 14 (left eye) as inputs, and outputs a feature amount. The CNN 302L includes a plurality of hierarchical sets each including two layers including a feature detection layer (S layer) and a feature integration layer (C layer). In the S layer, next features are detected on the basis of features detected in the preceding level. In the first S layer, feature amounts are detected on the basis of an eye image and three-dimensional information. Features detected in the S layer are integrated in the C layer in the same level, and sent to a next level as the result of detection in the level. The S layer includes one or more feature detection cell surfaces, and the feature detection cell surfaces detect different features. The C layer includes one or more feature integration cell surfaces, and pools the result of detection by the feature detection cell surfaces in the same level. Hereinafter, the feature detection cell surfaces and the feature integration cell surfaces will be collectively referred to as "feature surfaces" in the case where it is not necessary to particularly differentiate such surfaces. It is assumed that an output layer in the final level does not include a C layer but includes only an S layer.

Figure 23:
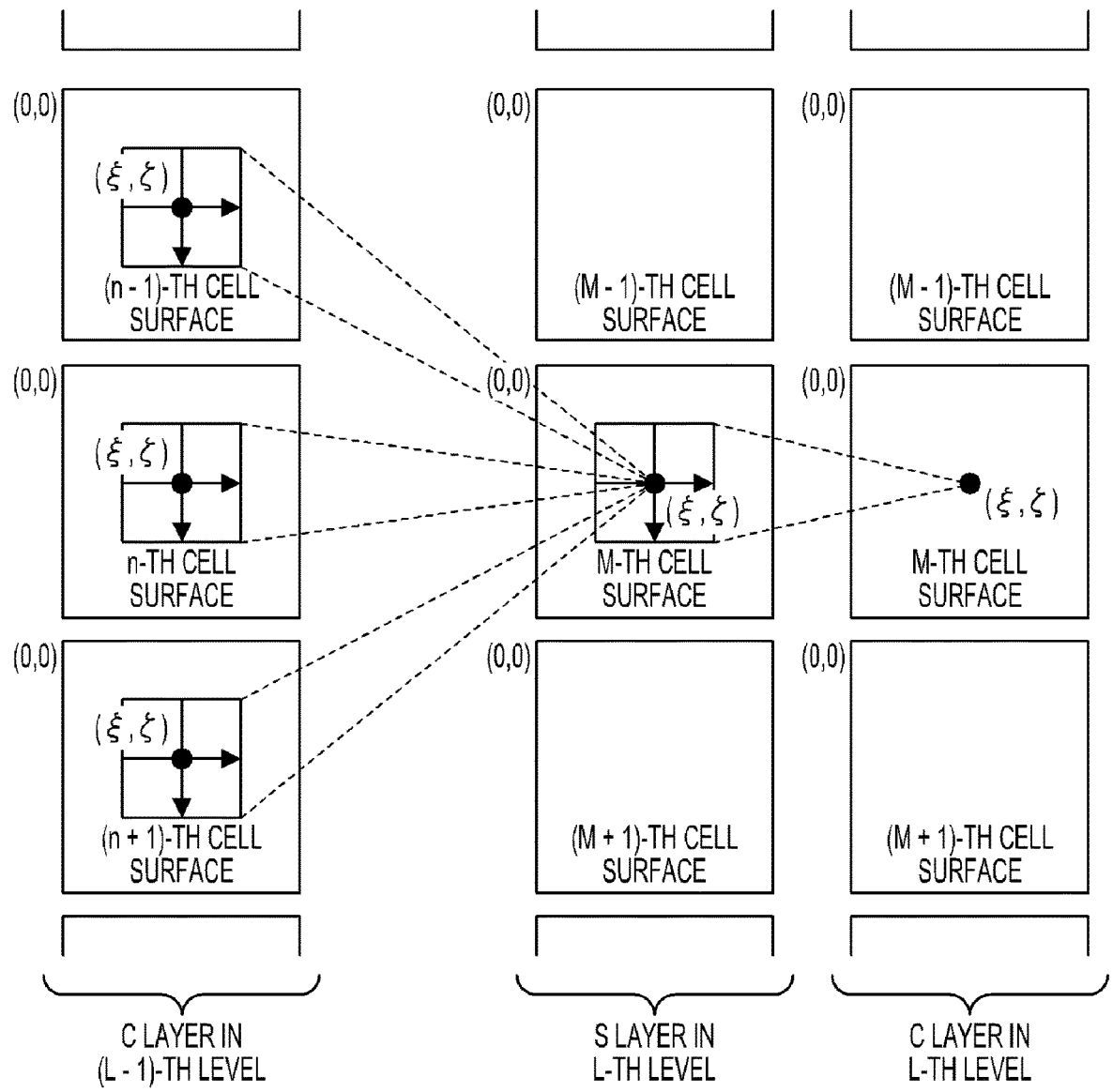
FIG. 23 illustrates a feature detection process and a feature integration process according to the second embodiment.

A feature detection process with feature detection cell surfaces and a feature integration process with feature integration cell surfaces will be described with reference to FIG. 23. The feature detection cell surfaces are constituted from a plurality of feature detection neurons, and the feature detection neurons are coupled to the C layer in the preceding level with a predetermined structure. The feature integration cell surfaces are constituted from a plurality of feature integration neurons, and the feature integration neurons are coupled to the S layer in the same level with a predetermined structure. An output value of a feature detection neuron at the position ($\xi$, $\zeta$) in the M-th cell surface in the S layer in the L-th level is indicated as $y_M^{LS}(\xi, \zeta)$, and an output value of a feature integration neuron at the position ($\xi$, $\zeta$) in the M-th cell surface in the C layer in the L-th level is indicated as $y_M^{LC}(\xi, \zeta)$. When coupling coefficients of the neurons are defined as $w_M^{LS}(n, u, v)$ and $w_M^{LC}(u, v)$, the output values can be represented by the following formulas 4 and 5.

[Math. 1]

$$y_M^{LS}(\xi, \zeta) = f(u_M^{LS}(\xi, \zeta)) = f\{\Sigma_{n,u,v} w_M^{LS}(n, u, v) \cdot y_n^{L-1C}(\xi+u, \zeta+v)\} \ldots \quad \text{(Formula 4)}$$

[Math. 2]

$$y_M^{LC}(\xi, \zeta) = u_M^{LC}(\xi, \zeta) = \Sigma_{u,v} w_M^{LC}(u, v) \cdot y_M^{LS}(\xi+u, \zeta+v) \ldots \quad \text{(Formula 5)}$$

f in the formula 4 indicates an activation function, which may be a logistic function or a sigmoid function such as a hyperbolic tangent function, and may be a tan h function, for example. $u_M^{LS}(\xi, \zeta)$ indicates the internal state of a feature detection neuron at the position ($\xi$, $\zeta$) in the M-th cell surface in the S layer in the L-th level. With the formula 5, a simple linear sum is calculated without using an activation function. In the case where an activation function is not used as with the formula 5, the internal state $u_M^{LC}(\xi, \zeta)$ of the neuron and the output value $y_M^{LC}(\xi, \zeta)$ are equal to each other. $y_n^{L-1C}(\xi+u, \zeta+v)$ in the formula 4 and $y_M^{LS}(\xi+u, \zeta+v)$ in the formula 5 are referred to as a coupling-target output value of the feature detection neuron and a coupling-target output value of the feature integration neuron, respectively.

$\xi, \zeta, u, v$, and n in the formulas 4 and 5 will be described. The position $(\xi, \zeta)$ corresponds to the position coordinate in the input image. In the case where $y_M^{LS}(\xi, \zeta)$ is a high output value, for example, it is meant that there is a high possibility that the feature detected in the M-th cell surface in the S layer in the L-th level is present at the pixel position $(\xi, \zeta)$ in the input image. In the formula 4, n means the n-th cell surface in the C layer in the (L−1)-th level, and is referred to as an integration-target feature number. Basically, product-sum operation is performed for all the cell surfaces that are present in the C layer in the (L−1)-th level. (u, v) is the relative-position coordinate of the coupling coefficient, and product-sum operation is performed in a finite range (u, v) in accordance with the size of the detected feature. The finite range (u, v) is referred to as a "receptive field". In the following, the size of the receptive field is referred to as a "receptive field size", and represented as the number of horizontal pixels by the number of vertical pixels being combined.

In the case where L=1 is met in the formula 4, that is, in the case of the first S layer, $y_n^{L-1C}(\xi+u, \zeta+v)$ indicates an input image $y^{in\_image}(\xi+u, \zeta+v)$ or an input position map $y^{in\_posi\_map}(\xi+u, \zeta+v)$. Since the neurons and the pixels are distributed discretely and the coupling-target feature numbers are also discrete, $\xi, \zeta, u, v$, and n are discrete values, rather than continuous variables. $\xi$ and $\zeta$ are non-negative integers, n is a natural number, and u and v are integers, and each have a value in a finite range.

$w_M^{LS}(n, u, v)$ in the formula 4 indicates the distribution of coupling coefficients for detecting a predetermined feature. It is possible to detect a predetermined feature by adjusting $w_M^{LS}(n, u, v)$ to an appropriate value. This adjustment of the distribution of coupling coefficients is learning. In constructing the CNN 302L, various test patterns are presented, and coupling coefficients are adjusted by gradually and repeatedly correcting the coupling coefficients such that $y_M^{LS}(\xi, \zeta)$ has an appropriate output value.

$w_M^{LC}(u, v)$ in the formula 5 can be represented using a two-dimensional Gaussian function by the following formula 6.

[Math. 3]

$$W_M^{LC}(u, v) = \frac{1}{2\pi\sigma_{L,M}^2} \cdot \exp\left(-\frac{u^2 + v^2}{2\sigma_{L,M}^2}\right) \quad \text{(Formula 6)}$$

Again, (u, v) is a finite range. Thus, the finite range is referred to as a "receptive field", and the size of the range is referred as a "receptive field size", as in the description of the feature detection neurons. The receptive field size may be set to an appropriate value in accordance with the size of the M-th feature in the S layer in the L-th level. σ in the formula 6 is a feature size factor, and may be set to an appropriate constant in accordance with the receptive field size. Specifically, σ is preferably set to a value that allows the outermost value of the receptive field to be considered as substantially zero.

A feature amount to be used for identification of the user can be obtained in the S layer in the final level by performing computation such as that discussed above in each level.

Summary

With the second embodiment, as discussed above, a user (person) can be identified (authenticated) precisely with a simple configuration by using correlation information related to the correlation between the line of sight of the right eye and the line of sight of the left eye.

The first and second embodiments are merely exemplary, and configurations obtained by appropriately modifying or changing the configurations according to the first and second embodiments within the scope and spirit of the present invention also fall within the present invention. Configurations obtained by appropriately combining the configurations according to the first and second embodiments also fall within the present invention.

With the present invention, it is possible to suppress double view of a virtual object displayed on a display apparatus of an optical see-through type.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-027123, filed on Feb. 24, 2022, which is hereby incorporated by reference herein in its entirety.

What is claimed is:

1. An electronic device comprising at least one memory and at least one processor which function as:

a gaze acquisition unit configured to acquire right gaze information related to a gaze of a right eye of a user that wears a display apparatus of an optical see-through type on a head and left gaze information related to a gaze of a left eye of the user;

a correlation acquisition unit configured to acquire, as information on personal differences, correlation information related to correlation between the gaze of the right eye and the gaze of the left eye on a basis of the right gaze information and the left gaze information; and a pupil measurement unit configured to measure a size of a pupil of the user, wherein the correlation acquisition unit acquires a plurality of correlation information respectively corresponding to a plurality of sizes of the pupil of the user, and after the plurality of correlation information is acquired, the display apparatus displays a virtual object for the right eye and the left eye with a parallax based on correlation information corresponding to the size measured by the pupil measurement unit.

2. The electronic device according to claim 1, wherein the display apparatus includes a right imaging element configured to capture the right eye and a left imaging element configured to capture the left eye; and the gaze acquisition unit acquires the right gaze information on a basis of a right-eye image obtained by the right imaging element, and acquires the left gaze information on a basis of a left-eye image obtained by the left imaging element.

3. The electronic device according to claim 1, wherein the at least one memory and the at least one processor further function as a display control unit configured to control the display apparatus so as to display a virtual object for the right eye and the left eye.

4. The electronic device according to claim 3, wherein the virtual object is a pointer displayed at a position that the user is seeing.

5. The electronic device according to claim 1, wherein the correlation acquisition unit acquires a plurality of correlation information respectively corresponding to a plurality of distances when the user sees each of a plurality of objects located at the plurality of distances from the user.

6. The electronic device according to claim 5, wherein the at least one memory and the at least one processor further function as a distance measurement unit configured to measure a distance from the user to an object, and after the plurality of correlation information are acquired, the display apparatus displays a virtual object for the right eye and the left eye with a parallax based on correlation information corresponding to the distance measured by the distance measurement unit such that the virtual object is visually recognized as overlapping the object.

7. The electronic device according to claim 1, wherein the correlation acquisition unit acquires a plurality of correlation information respectively corresponding to a plurality of spacings between the right eye and the left eye.

8. The electronic device according to claim 7, wherein the at least one memory and the at least one processor further function as a spacing measurement unit configured to measure a spacing between the right eye and the left eye, and after the plurality of correlation information is acquired, the display apparatus displays a virtual object for the right eye and the left eye with a parallax based on correlation information corresponding to the spacing measured by the spacing measurement unit.

9. The electronic device according to claim 1, wherein the correlation acquisition unit acquires a plurality of correlation information respectively corresponding to a plurality of orientations of the head.

10. The electronic device according to claim 9, wherein the at least one memory and the at least one processor further function as a head measurement unit configured to measure an orientation of the head, and after the plurality of correlation information is acquired, the display apparatus displays a virtual object for the right eye and the left eye with a parallax based on correlation information corresponding to the orientation measured by the head measurement unit.

11. The electronic device according to claim 1, wherein the correlation information is a convergence angle.

12. The electronic device according to claim 1, wherein the at least one memory and the at least one processor further function as an identification unit configured to perform personal identification using the correlation information.

13. The electronic device according to claim 1, wherein the electronic device is the display apparatus.

14. A control method of an electronic device, comprising:
acquiring right gaze information related to a gaze of a right eye of a user that wears a display apparatus of an optical see-through type on a head and left gaze information related to a gaze of a left eye of the user;

acquiring, as information on personal differences, correlation information related to correlation between the gaze of the right eye and the gaze of the left eye on a basis of the right gaze information and the left gaze information; and measuring a size of a pupil of the user, wherein a plurality of correlation information respectively corresponding to a plurality of sizes of the pupil of the user are acquired, and after the plurality of correlation information is acquired, the display apparatus displays a virtual object for the right eye and the left eye with a parallax based on correlation information corresponding to the measured size of the pupil.

15. A non-transitory computer readable medium that stores a program, wherein the program causes a computer to execute the control method according to claim 14.

16. An electronic device comprising at least one memory and at least one processor which function as:
a gaze acquisition unit configured to acquire right gaze information related to a gaze of a right eye of a user that wears a display apparatus of an optical see-through type on a head and left gaze information related to a gaze of a left eye of the user;

a correlation acquisition unit configured to acquire, as information on personal differences, correlation information related to correlation between the gaze of the right eye and the gaze of the left eye on a basis of the right gaze information and the left gaze information; and a head measurement unit configured to measure an orientation of the head, wherein the correlation acquisition unit acquires a plurality of correlation information respectively corresponding to a plurality of orientations of the head, and after the plurality of correlation information is acquired, the display apparatus displays a virtual object for the right eye and the left eye with a parallax based on correlation information corresponding to the orientation measured by the head measurement unit.

17. A control method of an electronic device, comprising:
acquiring right gaze information related to a gaze of a right eye of a user that wears a display apparatus of an optical see-through type on a head and left gaze information related to a gaze of a left eye of the user;
acquiring, as information on personal differences, correlation information related to correlation between the gaze of the right eye and the gaze of the left eye on a basis of the right gaze information and the left gaze information; and
measuring an orientation of the head, wherein
a plurality of correlation information respectively corresponding to a plurality of orientations of the head are acquired, and
after the plurality of correlation information is acquired, the display apparatus displays a virtual object for the right eye and the left eye with a parallax based on correlation information corresponding to the measured orientation of the head.

18. A non-transitory computer readable medium that stores a program, wherein the program causes a computer to execute the control method according to claim 17.

* * * * *